Jan. 29, 1963    R. C. CARLSON    3,075,400
CONTROL SYSTEM
Filed June 15, 1959    7 Sheets-Sheet 1

INVENTOR.
Reuben C. Carlson
BY
Atty.

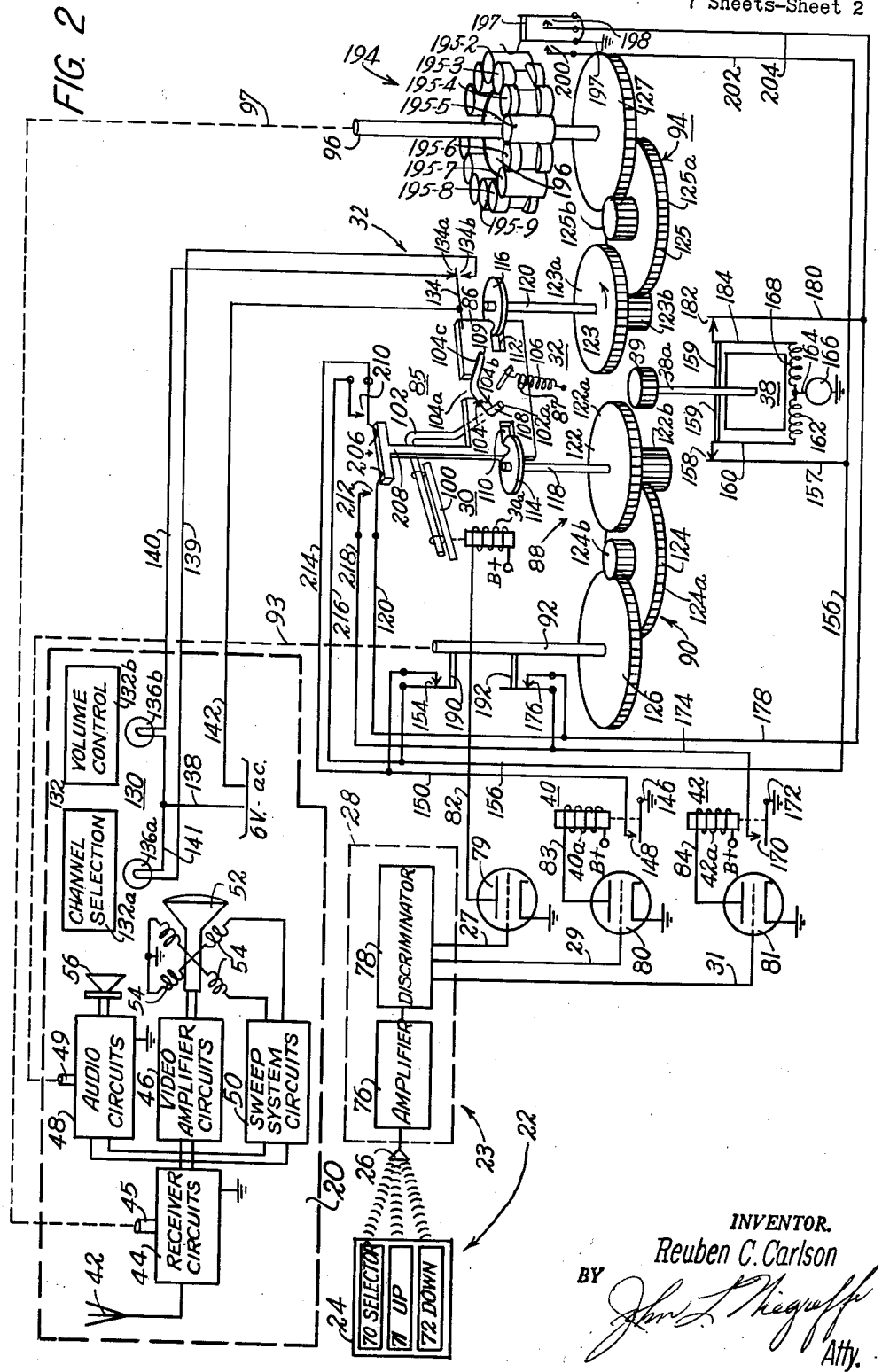

INVENTOR.
Reuben C. Carlson

Jan. 29, 1963

R. C. CARLSON 3,075,400

CONTROL SYSTEM

Filed June 15, 1959

INVENTOR.
Reuben C. Carlson
BY
Atty.

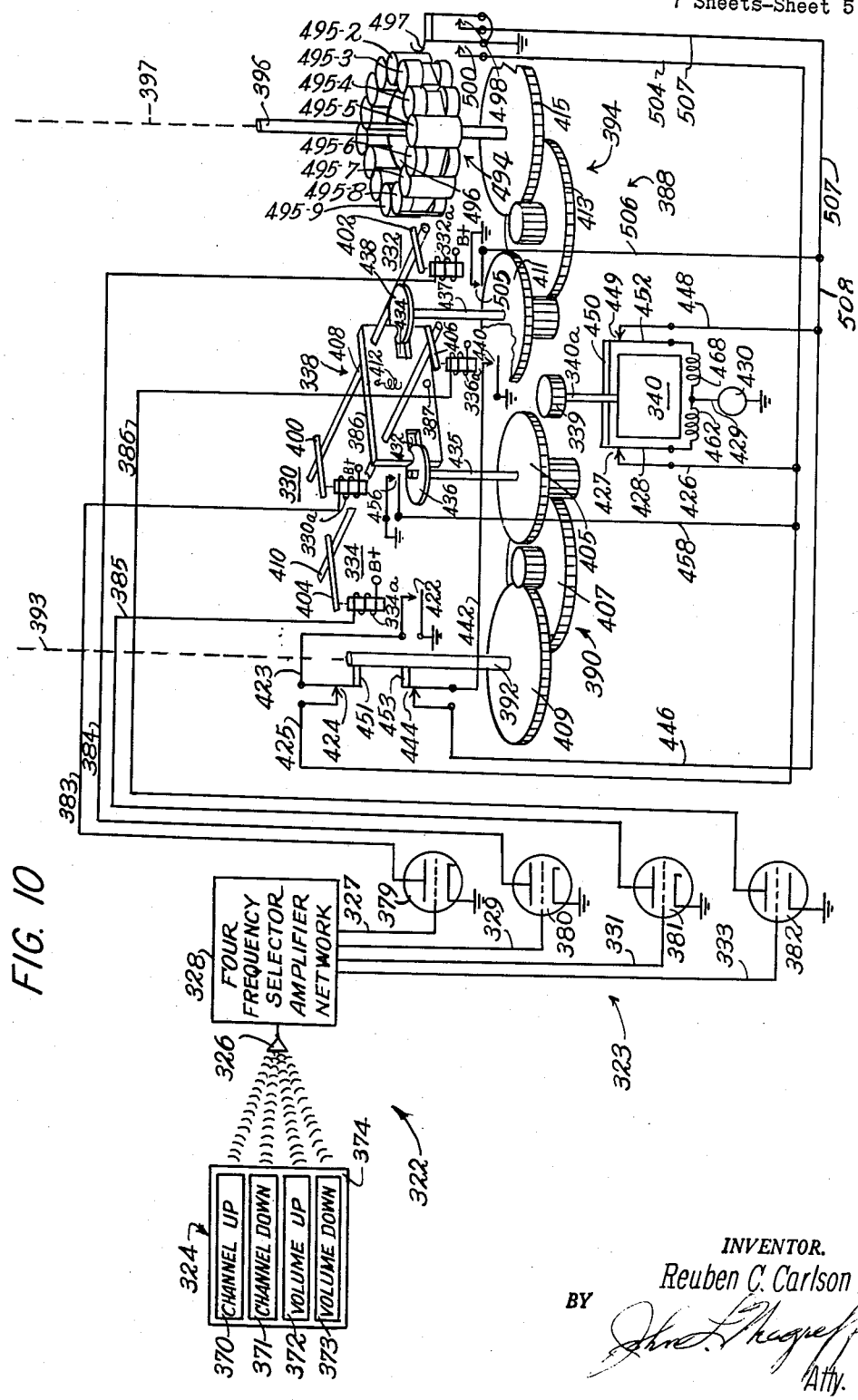

Jan. 29, 1963

R. C. CARLSON 3,075,400

CONTROL SYSTEM

Filed June 15, 1959

INVENTOR.
Reuben C. Carlson
BY
Atty.

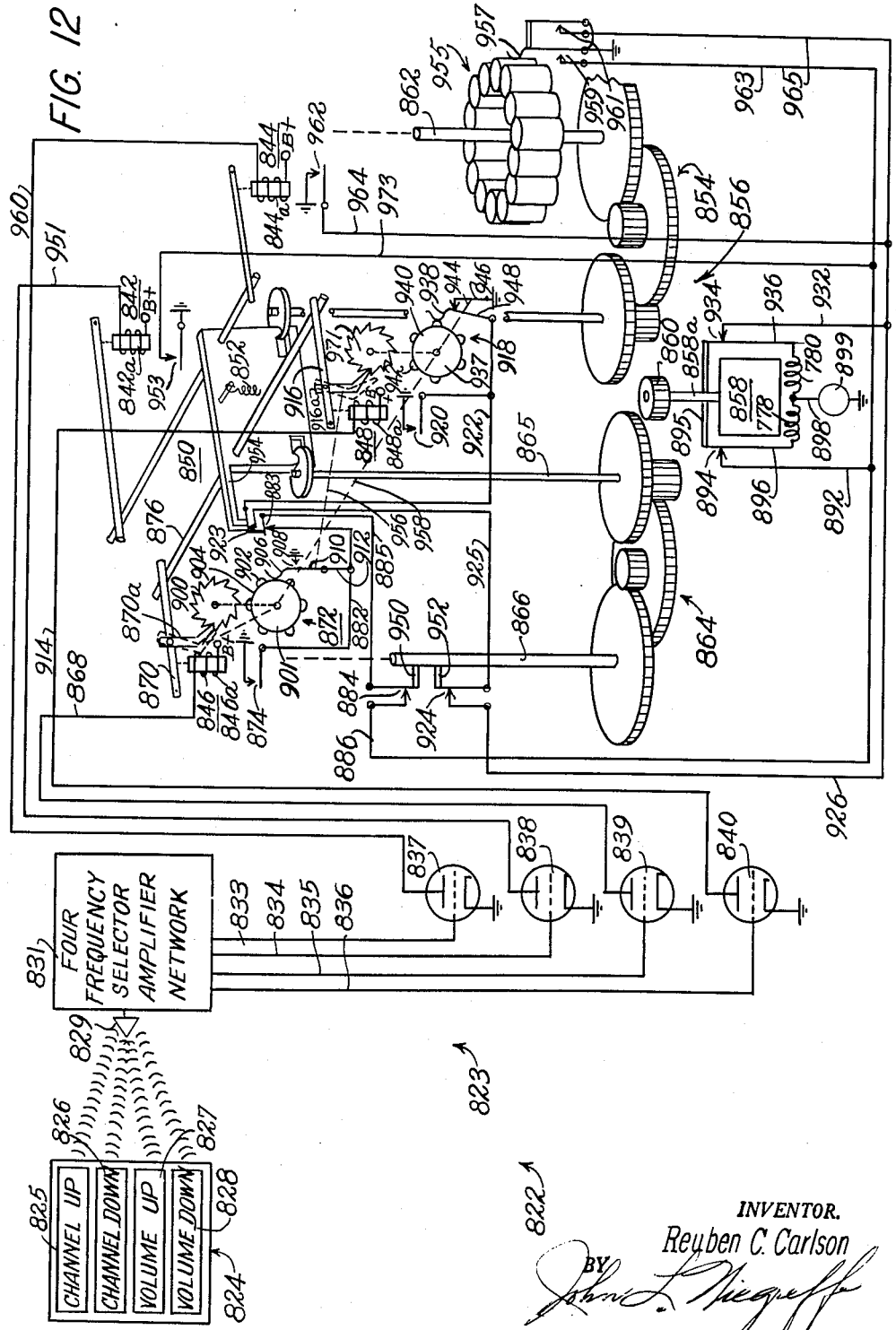

United States Patent Office 3,075,400
Patented Jan. 29, 1963

3,075,400
CONTROL SYSTEM
Reuben C. Carlson, Bensenville, Ill., assignor to Admiral Corporation, Chicago, Ill., a corporation of Delaware
Filed June 15, 1959, Ser. No. 820,468
6 Claims. (Cl. 74—472)

The present invention relates to control systems for controlling the operation of electrical circuit means and, more particularly, relates to a new and improved control system operable by energy signals radiated from a remotely positioned transmitter means.

The new and improved control system has particular utility in remotely controlling selected ones of the control functions of a wave signal or the like receiver. Although the invention is described in connection with a wave signal receiver, it should not be construed as being limited or restricted to this use since the invention has a wide variety of applications in other types of electrical apparatus.

It is an object of the present invention to provide a new and improved control system for controlling an electrical circuit means.

It is still another object of the present invention to provide a new and improved control system wherein the operative condition of a selected control function is incrementally adjustable in either a first or a second predetermined manner.

It is a further object of the present invention to provide a new and improved control system in which the operative condition of a selected control function is continuously adjustable in either a first or a second predetermined manner.

It is a further object of the present invention to provide a new and improved remote control system wherein one of a plurality of control functions in an electrical circuit is conditioned to be remotely controlled and then the selected control function is remotely controlled to change its operative condition.

It is another object of the present invention to provide a new and improved remote control system embodying suitable driving means operative in response to the transmission of energy signals to control the speed and direction of rotation of electrical elements associated with control functions in an electrical circuit means.

It is yet another object of the present invention to provide in a new and improved remote control system a prime mover means adapted to be drivingly coupled to electrical elements in an electrical circuit means to increase or decrease the operative condition of selected ones of the control functions of the electrical circuit means.

It is a further object of the present invention to provide a new and improved remote control system wherein energy signals are transmitted to render portions of a gearing mechanism effective and to effect a driving connection between electrical elements in an electrical circuit means and a prime motor means adapted to produce predetermined movement of the electrical elements.

It is still another object of the present invention to provide in a remote control system a new and improved gearing mechanism for selectively rotating in predetermined directions one of a plurality of control shafts.

It is a further object of the present invention to provide in a remote control system a new and improved gearing mechanism embodying first and second gear trains adapted to be rendered effective and driven by a prime mover for the purpose of controlling the speed and direction of rotation of a plurality of control shafts.

The above and other objects are realized in accordance with the present invention by providing an electrical circuit means with a new and improved remote control system adapted to be actuated by energy signals radiated from a transmitter. The transmitter is of the mobile or portable type and is manually operable to produce a plurality of distinguishable energy signals. In one aspect of the present invention, the control system is responsive to energy signals radiated by the transmitter to change, either incrementally or continuously, the operative condition of a selective control function of the electric circuit means in either a first on a second predetermined manner. Since the remote control system has particular application with a specific electrical circuit means, i.e., a wave signal receiver such as a television receiver, the following pairs of control functions, for example, can be remotely controlled: channel selection and volume, channel selection and fine tuning, channel selection and brightness, channel selection and contrast, volume and fine tuning, brightness and contrast, et cetera.

In another aspect of the present invention, the control system operates in response to energy signals radiated by the transmitter to drivingly connect a prime mover to selected ones of the electrical elements in an electrical circuit means for the purpose of increasing or decreasing the operative condition of selected ones of the control functions of the circuit means. In a first arrangement, the control system in response to a first energy signal radiated from the transmitter conditions a selected one of the control functions to be remotely controlled, and thereafter its operative condition is either increased or decreased by successively radiating second or third energy signals. To this end, in response to an energy signal one of a plurality of gear trains is rendered effective and the effective gear train and a prime mover, operable under the control of other energy signals, are drivingly coupled to rotate the electrical elements in a particular one of two directions. In a second arrangement, the control system is responsive to any one of four energy signals radiated from the transmitter to directly increase or decrease the operative condition of a selected one of the control functions. In this connection in response to one of four energy signals, one of the gear trains is rendered effective and simultaneously the prime mover is so energized as to rotate one of the electrical elements in a particular one of two directions. In either of the above two arrangements, the operative condition of the control function, except in the case of the channel selection function, associated with the driven electrical element is incrementally increased or decreased, the size of the increment being determined by the effective duration of the radiated signal.

In yet another aspect of the present invention, the control system is operative to provide controlled increments of adjustment of magnitudes determined by the interval between successive signal radiations independent of signal duration for a control function other than the channel selection function. Briefly, a driving connection between the prime mover and one of the electrical elements is effected in response to the transmission of an energy signal to initiate the change in the operative condition of the control function. The operative condition is continuously increased or decreased under the control of the prime mover means, and, when a desired operative condition is obtained, the driving connection between the prime mover and one of the electrical elements is broken in response to the transmission of the same energy signal. Accordingly, the continuous change in the operative condition of the selected control function is terminated at its desired level within the exclusive control of the operator of the transmitter.

In still a further aspect of the present invention, there is provided a new and improved gearing mechanism having a plurality of gear trains adapted to be selectively rendered effective by a rocker assembly. When rendered effective, the gear trains establish a driving connection between a prime mover means and different control shafts.

The direction of rotation of the prime mover means is controllable so that a selected rotation of any one of the control shafts may be obtained.

The invention, both as to its organization and method of operation, taken with further objects and advantages thereof, will best be understood by reference to the following description taken in connection with the accompanying drawings, in which:

FIG. 2 is a schematic view of the first embodiment of the remote control system of FIG. 1;

FIG. 10 is a schematic view of the second embodiment of the remote control system of FIG. 9;

FIG. 12 is a schematic view of the fourth embodiment of the remote control system of FIG. 11.

Figure 1:
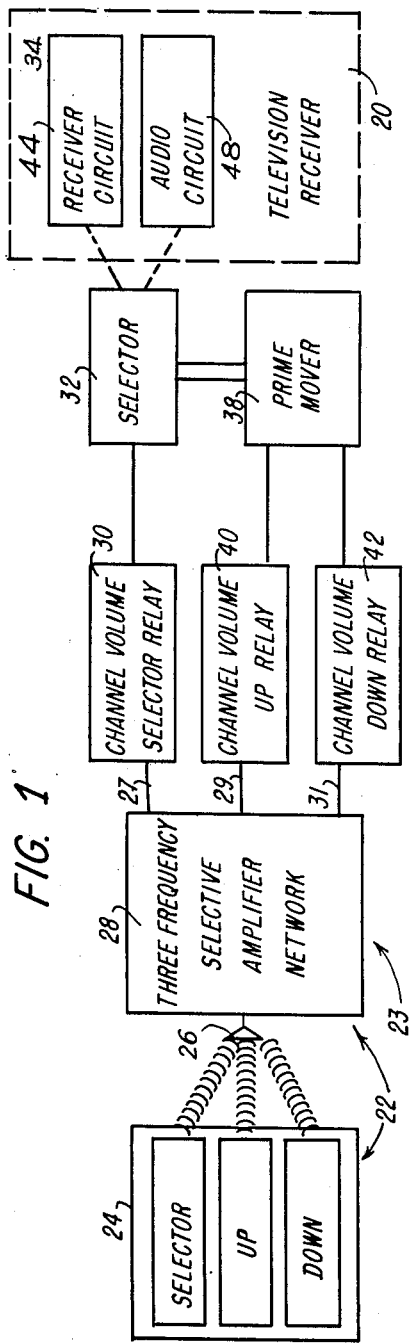
FIG. 1 is a diagrammatic view of first and third embodiments of the remote control system embodying the principles of the present invention.
Figure 9:
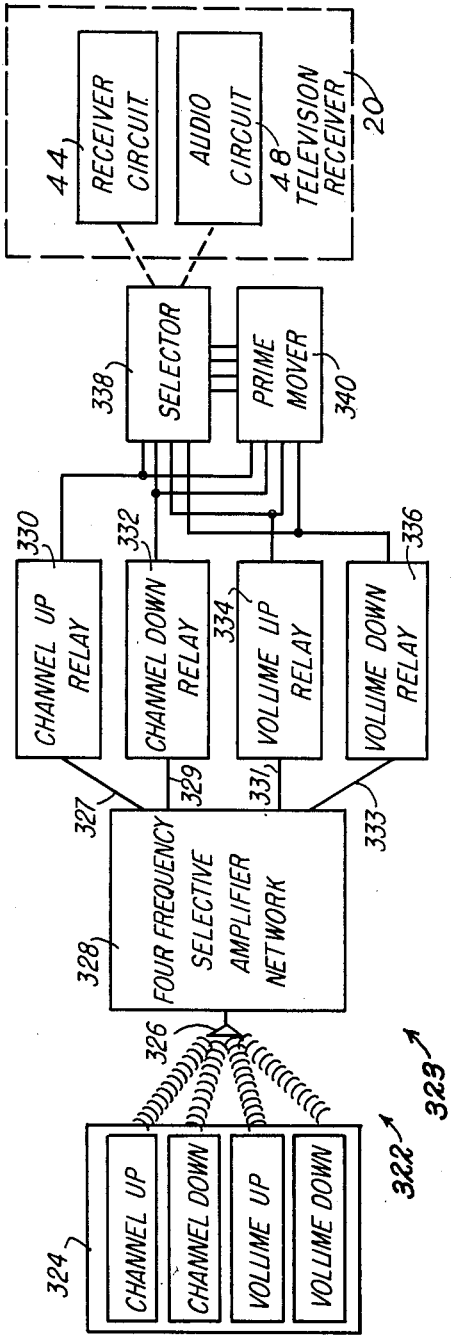
FIG. 9 is a diagrammatic view of second and fourth embodiments of the present invention.
Figure 11:
FIG. 11 is a schematic view of the third embodiment of the present invention.

Referring now to the drawings, a first and a third embodiment of a remote control system embodying the principles of the present invention are illustrated diagrammatically in FIG. 1 and schematically in FIGS. 2 and 11, respectively, while a second and fourth embodiment of a remote control system embodying the principles of the present invention are illustrated diagrammatically in FIG. 9 and schematically in FIGS. 10 and 12, respectively. To facilitate identification of the different embodiments of the remote control system, the embodiment shown in FIG. 2 is referred to hereinafter as the FIG. 2, three-button-incremental adjustment system, the embodiment shown in FIG. 10 is referred to hereafter as the FIG. 10, four-button-incremental adjustment system, the embodiment shown in FIG. 11 is referred to hereafter as the three-button-continuous adjustment system, and the embodiment shown in FIG. 12, as the FIG. 12, four-button-continuous adjustment system. Each of the remote control systems is used to control the operation of an electrical circuit means, for example, a wave signal receiver and particularly a television receiver, and comprises a portable transmitter adapted to generate energy signals, hereinafter called ultra-sonic signals, and further comprises a control system operable in response to the transmitted ultra-sonic signals to control the operative condition of one of a plurality of control functions of the television receiver. For illustrative purposes, two control functions of the television receiver are controlled by the above-referred to remote control systems, one of the control functions being channel selection and the other being volume. It should be understood that more than two control functions can be controlled by the system of the present invention and, further, that control functions other than channel selection and volume can be remotely controlled by the system of the present invention.

Considering now briefly the FIG. 2, three-button-incremental adjustment embodiment, a conventional television receiver 20 is illustrated in block form as an example of the type of electrical circuit means that can be controlled by a remote control system 22 comprising a control system 23 actuable by a remotely positioned transmitter 24. As is well known, the television receiver has many control functions, for example, on-off, volume, fine tuning, brightness, contrast, and channel selection. The television receiver circuit includes a plurality of adjustable electrical elements which are manually controllable to adjust the control functions of the television receiver 20. Particularly, insofar as the volume and channel selection control functions are concerned, the electrical elements involved are a resistive potentiometer including a rotatable shaft and a main tuning shaft, respectively.

In FIG. 1, the transmitter 24, per se, is a conventional acoustical transmitter which is manually operable to develop three distinguishable energy signals of predetermined magnitude and frequency. The ultra-sonic signals are separately radiated from the transmitter 24 for detection by the control system 23 which is located preferably adjacent to the television receiver 20. In fact, the control system 23 is ideally supported from the chassis of the television receiver 20 so that it is enclosed within the television cabinet out of view of an observer of the receiver 20.

Briefly, the control system comprises an input circuit including a microphone 26 for converting the ultra-sonic signals into electric signals having frequencies respectively corresponding to the frequencies of the ultra-sonic signals. The electrical signals are coupled to a three-frequency selective amplifier network 28 including an amplifier circuit and a discriminator circuit. In response to the transmission of a first ultra-sonic signal, the discriminator circuit causes a conductor 27 to be energized to effect the operation of a channel-volume selector relay 30. The selector relay 30 controls a selector 32 which comprises a gearing mechanism including separate gear trains adapted to be rendered effective by a rocker assembly to prepare a driving connection between a prime mover 38 and either the volume potentiometer shaft or the main tuning shaft associated with the volume and channel selection control functions of the television receiver 20. Actually, the selector 32 alternately is actuated in response to successively radiated, first ultra-sonic signals to cause the gear trains associated with the potentiometer shaft and the main tuning shaft, respectively, to be alternately rendered effective for subsequent driving engagement with the prime mover 38. The prime mover 38 is selectively energized by a channel-volume up relay 40 and a channel-volume down relay 42 to cause the prime mover 38 to move in such a direction that a desired rotation in the potentiometer shaft and the main tuning shaft is effected. Consequently the sound level of the receiver and the channel to which the receiver is tuned are changed in a desired manner. After a control function of the television receiver 20 is selected to be remotely controlled, for example the volume control, the transmitter 24 is manually operated to radiate a second ultra-sonic signal which is detected and converted by the microphone 26 into a second electrical signal. The second electrical signal is fed to the amplifier network 28 wherein the discriminator circuit causes a conductor 29 to be energized to effect the operation of the channel-volume up relay 40, with the result that the prime mover 38 is energized to drive the effective gear train in the selector 32 in a predetermined direction to so actuate the volume potentiometer shaft that the sound level of the receiver 20 is incrementally increased to a higher level. The sound level of the receiver 20 is further incrementally increased to a yet higher level by the successive transmission of the second ultra-sonic signals. On the other hand, if it is desired to decrease the sound level of the receiver when the volume control function is selected by the selector 32, the transmitter 24 is operated to radiate a third ultra-sonic signal which is detected and converted by the microphone 26 into a third electrical signal. This third electrical signal is fed to the amplifier network 28 wherein the discriminator circuit causes a conductor 31 to be energized to effect the operation of the channel-volume down relay 42. The operation of the relay 42 causes the prime mover 38 to drive the effective gear train of the selector 32 in the opposite direction to that obtained above and the volume potentiometer shaft is adjusted so that the sound level of the television receiver 20 is incrementally decreased. The sound level of the receiver 20 is further incrementally decreased by the successive transmission of the third ultra-sonic signals. The channel selection control function is remotely controlled by transmitting a first ultra-sonic signal to cause the selector 32 to render effective the gear train associated with the main tuning shaft. Thereafter, either the second or third ultra-sonic signals are successively transmitted to tune the receiver 20 to the desired channel.

Considering now in greater detail the television receiver 20 controlled by the remote control system 22 and referring now to FIG. 2, it includes an antenna 42 coupled to a receiving circuit 44 which comprises the usual radio-frequency amplifier section, station selector section including the above-referred to main tuning shaft 45 and a fine tuning arrangement, first detector section, intermediate frequency-amplifier section, and second detector section. As shown, the output of the receiving circuit 44, i.e., the output of the second detector section, is coupled to a video amplifier 46, an audio circuit 48 including volume potentiometer having a shaft 49, and a sweep system circuit 50. The output of the video amplifier circuit 46 is coupled to an electronic gun embodied in a cathode ray tube 52, while the output of the sweep system circuit 50 is coupled to a deflection yoke of the cathode ray tube 52, illustrated schematically by coils 54. The output of the audio circuit 48 is coupled directly to a conventional loudspeaker 56, the sound level of which is controlled by adjustment of the potentiometer shaft 49. Since the construction and operation of the television receiver 20 is well known and comprises no part of the present invention, a description of its operation is not included herein.

The construction and operation of the FIG. 2, three-button-incremental change remote control system will now be described in detail. The transmitter 24, as suggested above, is of the acoustic resonator type and comprises three resonator rods individually identified as a selector rod 70, an up rod 71, and a down rod 72, which are supported from a casing 74 of the transmitter 24. Each of the resonator rods 70, 71, and 72 is adapted to be shock-excited by a suitable manually-operable hammer, or the like (not shown), to produce an ultra-sonic signal having a frequency corresponding to the length and/or configuration of the rod. In a transmitter 24 used with a control system constructed in accordance with the principles of the present invention, the frequency of the ultra-sonic signal radiated by the resonator rod 70 is 38.285 kc., the frequency of the ultra-sonic signal radiated by the resonator rod 71 is 39.285 kc., while the frequency of the ultra-sonic signal radiated by the resonator rod 72 is 40.805 kc. None of these ultra-sonic signals, hereinafter referred to individually as the first, second and third ultra-sonic signals, has a constant amplitude but each has an amplitude that exponentially decreases as time progresses. As previously suggested, the selector resonator rod 70 causes the control system 22 to condition either the channel selection control function or the volume control function to be remotely controlled. More particularly, repeated striking of the selector resonator rod 70 alternately conditions the channel selection and the volume control functions to be remotely controlled by either the up resonator rod or the down resonator rod 72. The second ultra-sonic signal radiated by the up resonator rod 71 causes the control system 23 to incrementally increase the operating condition of the selected control function and, in response to repeated striking of the rod 71, a desired operating condition for the selected control function is obtained. On the other hand, the third ultra-sonic signal radiated by the down resonator rod 72 causes the control system 23 to incrementally decrease the operating condition of the selected control function and, similarly, in response to repeated striking of the rod 72, a desired operating condition for the selector control function is obtained.

Each of the ultra-sonic signals radiated by the resonator rods 70, 71, and 72 is detected by the microphone 26 embodied in the input circuit of the control system 23. The mechanical energy of the ultra-sonic signals are respectively converted into electrical signals having the same frequencies as the ultra-sonic signals, i.e., 38.285 kc. 39.285 kc., and 40.805 kc. These A.C. electrical signals are coupled to the three-frequency selective amplifier network 28 and, particularly to an amplifier 76 which amplifies the signals developed by the microphone 26. The amplified electrical signals are fed into a discriminator 78 which causes: a D.C. pulse to be supplied to conductor 27 in response to the first electrical signal, a D.C. pulse to be supplied to the conductor 29 in response to the second electrical signal, a D.C. pulse to be supplied to the conductor 31 in response to the third electrical signal. The conductors 27, 29 and 31 are respectively connected to the grids of negatively-biased, control tubes 79, 80 and 81 which are rendered conductive by the application of the D.C. pulse to their respective grids. As shown, the plate circuits of the tubes 79, 80 and 81 include control windings 30a, 40a, and 42a of the channel-volume selector relay 30, channel-volume up relay 40, and the channel-volume down relay 42, respectively. Hence, in response to the transmission of any one of the three ultra-sonic signals, the associated one of the tubes 79, 80 or 81 is rendered conductive so that current flows through the associated windings 30a, 40a, or 42a to operate the corresponding relay 30, 40 or 42.

The operation of the selector relay 30 in response to the first ultra-sonic signal causes the selector 32 to be actuated. The selector 32 comprises both a rocker assembly 85 including a rocker 86 and a gearing mechanism 88 mechanically associated with the rocker 86. In response to successively radiated, first ultra-sonic signals, the rocker 86 alternately moves into its two operative positions under the control of the selector relay 30 to render alternately effective gear trains 90 and 94 embodied in the gearing mechanism 88. In a first operative position, the rocker 86 renders effective the gear train 90, i.e., conditions the gear train 90 to be subsequently driven by the prime mover 38 comprising a bidirectional, A.C. electric motor. The gear train 90 drivingly engages a control shaft 92 which is mechanically connected, as indicated by dotted line 93, to the volume resistive potentiometer 49 located in the audio circuit 48 of the television receiver 20. In its second operative position, the rocker 86 renders effective the gear train 94, i.e., conditions the gear train 94 to be subsequently driven by the electric motor 38. The gear train 94 drivingly engages a control shaft 96 which is mechanically connected, as indicated by dotted lines 97, to the main tuning shaft 45 of the receiver circuit 44 of the television receiver 20.

A driving connection between the motor 38 and either the volume potentiometer shaft 49 or the main tuning shaft 45 is effected by the energization of the motor 38 under the control of the up relay 40 or the down relay 42 operated in response to the transmission of either the second or third ultra-sonic signal. The energized motor 38 drivingly engages either the gear train 90 or 94 rendered effective by the rocker assembly 85 to rotate either the control shafts 92 or 96. The relays 40 and 42 so energize the motor 38 that the output shaft 38a of the motor 38 rotates in a clockwise or counterclockwise direction, with the result that the potentiometer shaft 49 or main tuning shaft 45 associated with the control shafts 92 and 96 is rotated to either increase or decrease the operative condition of its associated control function, i.e., either to increase or decrease the sound level of the television receiver 20 or to tune the television receiver to a higher or a lower channel.

Assuming that the channel selection control function is conditioned to be remotely controlled and it is desired to adjust the volume of the television receiver 20, the transmitter 24 is operated to cause the selector resonator rod 70 to radiate a first ultra-sonic signal. This signal is converted by the microphone 26 into an electrical signal which is fed to the amplifier 76 and then the discriminator 78. This first electrical signal causes a D.C. pulse to be applied to the conductor 27, thereby to render the control tube 79 conductive to complete an energizing circuit for the relay 30, as follows: ground, tube 79, conductor 82, winding 30a, and B-plus. The operation of the relay 30 causes the armature 100 to be moved downwardly, as viewed in FIG. 2, to actuate the rocker assembly 85. The rocker assembly 85 includes an arm 102 rotatably supported from the armature 100 and provided with an angulated finger 102a which coacts with an inverted Y-slot structure 104 defined in the upper edge of the rocker 86. The rocker 86 is pivotally mounted on a suitably supported pivot pin 87 and includes an overcenter spring arrangement 106 which, in cooperation with the angulated finger 102a, causes the rocker 86 to be moved between its two operative positions, one of which is illustrated in FIG. 2 and the other of which is not shown but is a mirror image of the illustrated position of FIG. 2. Although not shown, when the rocker 86 is in the latter position prior to operation of the relay 30, the angulated finger 102a is located above the rocker 86 and specifically is vertically above a leg portion 104a and the upper end of an arm portion 104b of the slot structure 104.

Thus, in response to the first ultra-sonic signal, the downward movement of the armature 100 of the relay 30 causes the angulated finger 102a of the supported arm 102 to move downwardly through the leg portion 104a of the slot structure into the arm portion 104b. The arm portion 104b, being directly beneath the finger 102a, intercepts and guides the finger 102a into engagement with its end 108 (see FIG. 2), whereby the rocker 86 is moved from its operative position inclined downwardly to the right (not shown) into its operative position inclined downwardly to the left, shown in FIG. 2. Actually, the angulated finger 102a of the arm 102 exclusively moves the rocker 86 out of its operative position (not shown) and, when the rocker 86 moves substantially over center, the over-center spring mechanism 106 coacts with the angulated finger 102a to move the rocker 86 into its position shown in FIG. 2. The spring mechanism 106 also functions to resiliently bias and maintain the rocker 86 in its operative position. The angulated finger 102a remains in engagement with the end 108 of the arm portion 104b during transmission of the first ultra-sonic signal and, when at the end of the transmission of the first ultra-sonic signal the relay 30 is deenergized, the angulated finger 102a moves upwardly in the arm portion 104b and the leg portion 104a under the control of the armature 100 into its position above the rocker 86. The upwardly moving finger 102a does not actuate the rocker 86 since the arm 102 is rotatably supported from the armature 100 and the spring mechanism 106 restrains the rocker 86 against any slight movement that might be produced by the upwardly moving finger 102a. It will be appreciated that with the rocker 86 in the position illustrated in FIG. 2, an arm portion 104c of the slot structure 104 is moved directly beneath the angulated finger 102a so that, incident to a successive operation of the relay 30, the angulated finger 102a is directed into the arm portion 104c and hence, into engagement with the end 109 of the portion 104c, thereby to move the rocker 86 from the position shown in FIG. 2 to its other operative position (not shown).

The rocker assembly 85 controls the operation of the gearing mechanism 88 and, in this connection, the rocker 86 is mechanically connected to the gear trains 90 and 94 by spindle and disc arrangements. As clearly shown in FIG. 2, the vertical edges of the rocker 86 are slotted to produce openings 110 and 112 having neck portions adjacent the edges of the rocker 86. The openings 110 and 112, respectively, accommodate discs 114 and 116 which are fixedly mounted on vertically movable spindles 118 and 120, respectively. These spindles 118 and 120 are journaled in suitable supporting means to permit rotation and axial movement thereof. As shown, the low ends of the spindles 118 and 120 are fixedly secured to vertically movable input gears 122 and 123 of the gear trains 90 and 94. Accordingly, since the gears 122 and 123 are rotated when the gear trains 90 and 94 are driven by the motor 38, the discs 114 and 116 likewise rotate in the openings 110 and 112, and, in this connection, the neck portions of the openings 110 and 112 provide bearing surfaces for the rotating discs 114 and 116. In addition, the neck portions coact with the rotating discs 114 and 116, respectively, to move the spindles 118 and 120 upwardly and downwardly, respectively, incident to movement of the rocker 86 by the selector relay 30.

The input gears 122 and 123 are alternately moved into their downward positions under the control of the rocker 86 with the result that their associated gear trains 90 and 94 are alternately rendered effective; conversely, the input gears 123 and 122 are alternately moved into their upward positions under the control of the rocker 86 whereby their associated gear trains 94 and 90 are rendered ineffective. More specifically, prior to transmission of the above-referred-to first ultra-sonic signal, the rocker 86 is in its operative position (not shown) and the input gear 123 is in its downward position to be drivingly engaged by the axially movable pinion gear 39 incident to subsequent energization of the motor 38. Accordingly, the gear train 94 is rendered effective, a driving connection between the input gear 123 and the control shaft 96 being at all times established, irrespective of the effective or ineffective condition of the gear train 94, as follows: a spur gear 123a, a pinion gear 123b, a spur gear 125a, a pinion gear 125b, a spur gear 127 and the control shaft 96. It will be understood that the location of the input gear 123 under the control of the rocker 86 (through the disc 116 and spindle 120) determines the effective and ineffective condition of the gear train 94 and, thus, whether or not the gear train 94 is subsequently drivingly engaged by the pinion gear 39 as a result of the energization of the motor 38.

Returning now to the movement of the rocker 86 from its operative position (not shown) to its FIG. 2 position caused by the transmission of the first ultra-sonic signal and the operation of the selector relay 30, the gear train 94 is rendered ineffective by the upward displacement of the input gear 123, the input gear 123 being moved into a position out of driving engagement with the axially movable pinion gear 39 of the subsequently energized motor 38. The movement of the rocker 86 also renders the gear train 90 effective by displacing the input gear 122 downwardly into a position to be drivingly engaged by the axially movable pinion gear 39 of the subsequently energized motor 38, a driving connection between the input gear 122 and the control shaft 92 being at all times established, irrespective of the effective or ineffective condition of the gear train 90, as follows: a spur gear 122a, a pinion gear 122b, spur gear 124a, pinion gear 124b, spur gear 126, and the control shaft 92. It should be observed that at this time the effective gear train 90 is neither driven by the motor 38, nor is it in driving engagement with the pinion gear 39 of the motor 38. Moreover, a driving connection between the motor 38 and the potentiometer shaft 49 is obtained only after the motor 38 is energized under the control of the up relay 40 or the down relay 42 and, thus, the gears 122, 124 and 126, and the control shaft 92 are rotated only after driving engagement is effected between the axially movable pinion gear 39 and the input gear 122.

In order to identify the control function of the receiver 20 that is conditioned to be remotely operated, an indicating means 130 is located preferably in the front of the television receiver 20. To this end, the indicating means 130 comprises a generally translucent plate 132 seated over a recessed portion provided in the front of the cabinet of the receiver 20, the plate 132 being divided into separate windows 132a and 132b which are respectively marked "channel selection" and "volume control." The windows 132a and 132b are alternately illuminated by lamps 136a and 136b suitably supported from the recessed portion of the cabinet, which lamps 136a and 136b are controlled by a position-sensitive switch 134 actuable by the rocker 86.

Specifically, as the rocker 86 moves from its operative position (not shown) to its FIG. 2 position in response to operation of the selector relay 30 by the first ultrasonic signal, the channel-selection window 132a is darkened and the volume control window 132b is illuminated. More particularly, an energizing circuit for the bulb 136a is opened by the opening of the contacts 134b and an energizing circuit for the bulb 136b is completed by closure of contacts 134a, as follows: a six-volt, A.C. source, preferably supplied by the power source of the television receiver 20, a conductor 138, the bulb 136b, a conductor 140, switch contacts 134a, and a conductor 142 connected to the six-volt source. It will be understood that as the selector relay 30 is successively operated in response to repetitively transmitted, first ultrasonic signals, the rocker 86 is alternately moved between its operative positions so that the volume control window 132b and the channel-selection window 132a are alternately illuminated. Thus, irrespective of the condition of the remote control system, the operator of the transmitter 24 is at all times informed of the control function that is conditioned to be remotely operated.

With the volume control function selected, the operative condition of the volume control, i.e., the sound level of the television receiver 20, can be either increased or decreased at the will of the operator of the transmitter 24. If it is desired to increase the sound level of the receiver 20, the transmitter 24 is operated to cause the up resonator rod 71 to radiate a second ultra-sonic signal. This signal is converted by the microphone 26 into a second electrical signal which is supplied to the amplifier 76 and then into the discriminator 78. The discriminator 78 in response to the second electrical signal supplies a D.C. pulse to the conductor 29 and, hence, the grid of the control tube 80. Accordingly, the negatively-biased tube 80 is rendered conductive to complete an energizing circuit for the up relay 40, as follows: ground, tube 80, conductor 83, relay winding 40a, and B-plus.

Incident to operation of the up relay 40, an energizing circuit for a control winding 162 of the electrical motor 38 is completed, as follows: ground, conductor 146, contacts 148, conductor 150, contacts 154 controlled by a position limit cam 190 mounted on the control shaft 92, conductor 156, conductor 157, contacts 158 controlled by a friction cam 159 mounted on the motor driving shaft 38a, conductor 160, motor control winding 162, conductor 164, an A.C. electrical source 166, and ground. The energization of the control winding 162 under the control of the relay 40 effects the rotation of the motor driving shaft 38a in a clockwise direction, as viewed in FIG. 2, whereas the energization of a second control winding 160 under the control of the down relay 42, as described below, effects the rotation of the motor driving shaft 38a in a counterclockwise direction as viewed in FIG. 2. In addition to the motor driving shaft 38a rotating in a clockwise direction, as a result of the control winding 162 being energized, the shaft 38a moves axially upward so that the pinion gear 39 moves into an operative position in driving engagement with the gear 122 of the gear train 90. Accordingly, a driving connection is obtained between the motor 38 and the gear train 90 with the result that the volume potentiometer shaft 49 is driven by the motor 38 and the sound level of the receiver 20 is increased. Particularly, with clockwise rotation of the pinion gear 39, the control shaft 92 rotates in a counter-clockwise direction, as seen in FIG. 2, and, assuming that the mechanical connection 93 to the potentiometer shaft 39 provides a direct driving connection, the potentiometer shaft 49 can be considered as also rotating in a counter-clockwise direction, as shown in FIG. 2. This rotation of the volume potentiometer shaft 49 causes the movable wiper of the volume potentiometer to move toward the upper end of its range, thereby to increase the output of the audio circuit 48 and the volume of the loudspeaker 56.

The sound level of the receiver 20 is incrementally increased by the operation of the up relay 40 in response to the transmission of the second ultrasonic signal. In this connection, the motor 38 is energized only during the duration of the transmission of the second ultra-sonic signal, since the discriminator 78 supplies a D.C. pulse to the grid of the normally non-conductive tube 80, only as long as the second ultrasonic signal is being transmitted. Consequently, at the end of the duration of the second ultra-sonic signal, the discriminator 78 no longer supplies the D.C. pulse to the conductor 29, with the result that the negatively-biased tube 80 becomes nonconductive and the relay 40 becomes deenergized. Incident to deenergization of the relay 40, the contacts 148 are opened to open the energizing circuit for the motor control winding 162. The deenergized motor 38 causes the motor driving shaft 38a and its pinion gear 39 to move axially downward, as viewed in FIG. 2, out of driving engagement with the input gear 122 of the gear train 90 so that the driving connection between the motor 38 and the gear train 90 is broken and the movement of the volume potentiometer shaft 49 is arrested.

In the event that the sound level of the receiver 20 remains too low even as a result of the above-described change, the transmitter 24 is repeatedly operated to transmit successive, second ultra-sonic signals until the desired sound level is obtained. Specifically, the successively radiated, second ultra-sonic signals repeatedly operate the relay 40 which causes the successive energization of the motor control winding 162 for intervals of time equal to the duration of the signals, whereby the potentiometer shaft 49 is successively rotated into discrete, equally displaced angular positions to incrementally increase the output of the audio circuit 48 and hence the volume of the loudspeaker 56.

On the other hand, if it is desired to decrease the sound level of the receiver 20, the transmitter 24 is operated to cause the down resonator rod 72 to radiate a third ultra-sonic signal. The third ultra-sonic signal, as described above, causes the discriminator 78 to supply a D.C. pulse to the conductor 31 and hence the grid of the normally negative-biased, control tube 81. The control tube 81 is rendered conductive to complete an energizing circuit for the down relay 42, as follows: ground, control tube 81, conductor 84, relay winding 42a, and B-plus. The relay 42 operates to close a pair of contacts 170 which completes an energizing circuit for the control winding 168 of the motor 38, as follows: ground, conductor 172, contacts 170, conductor 174, contacts 176 controlled by a position limit cam 192 mounted on the control shaft 92, conductor 178, conductor 180, contacts 182 controlled by the friction cam 59 mounted on the motor shaft 38a, conductor 184, the control winding 168, the conductor 164, the A.C. source 166, and ground. The energization of the control winding 168 causes the motor drive shaft 38a simultaneously to rotate in a counterclockwise direction and to move axially upward so that its pinion gear 39 drivingly engages the gear 122 of the gear train 90. Thus, a driving connection is effected between the motor 38 and the potentiometer shaft 49 whereby the shaft 49 is driven by the motor 38, and the sound level of the receiver 20 is decreased. Particularly, with the counterclockwise rotation of the pinion gear 39, the control shaft 92 and, thus, the potentiometer shaft 49 rotate in a clockwise direction. This rotation of the shaft 49 causes the movable wiper of the volume potentiometer to move toward the lower end of its range, thereby to increase the output of the audio circuit 48 and the volume of the loudspeaker 56.

Similar to the above-described operation, the sound level of the receiver 20 is incrementally decreased by the operation of the down relay 42 in response to the transmission of the third ultra-sonic signal. Specifically, the motor control winding 168 remains energized only as long as the relay 42 is operative, the relay 42 being operative only during the duration of the third ultra-sonic signal. At the end of the duration of the third ultra-sonic signal, the D.C. pulse is removed from the conductor 31, with the result that the control tube 81 becomes nonconductive to open the energizing circuit for the relay 42. The deenergization of the relay 42 causes the contacts 170 to open with the result that the energizing circuit for the motor control winding 168 is opened and the motor driving shaft 38a is moved axially downward out of engagement with the gear train 90. Accordingly, the driving connection between the motor 38 and the potentiometer shaft 49 is broken and the movement of the potentiometer shaft 49 is stopped.

In the event that the sound level of the receiver is not low enough as a result of the above-described change, the transmitter 24 is repeatedly operated to transmit successive, third ultra-sonic signals which successively operate the relay 42 and effect the successive energization of the motor control winding 168 for predetermined time intervals corresponding to the time duration of the third ultra-sonic signals. Consequently, the potentiometer shaft 49 is successively rotative into discrete, equally displaced angular positions to incrementally decrease the output of the audio circuit 48 and hence the volume of the loudspeaker 56.

Inasmuch as the potentiometer shaft 49 is operative over a range of approximately 320° and is not adjustable throughout a range of 360°, the contacts 154 and 176 are serially connected in the energizing circuits for the motor control winding 162 and 168, respectively, to automatically open-circuit the motor 38 when the potentiometer shaft 49 reaches the upper and lower ends of its operative range. In this connection, position limit cams 190 and 192 are so located on the control shaft 92 that the contacts 154 and 176 automatically open incident to movement of the potentiometer shaft 49 into the respective ends of its operative range.

It will be understood that if the potentiometer shaft 49 reaches the upper end of its operative range during the transmission of the second ultra-sonic signal, the cam 192 opens the contact 154 to open-circuit the motor control winding 162. Thus, even though the relay 40 is operative, the motor 38 is deenergized and the driving connection between the motor 38 and the potentiometer shaft 49 is broken. Since the contacts 154 remain open under the control of the position limit cam 190, successively radiated, second ultra-sonic signals merely cause the repeated operation of the up relay 40 but do not effect the energization of the motor control winding 162. Hence, the motor control winding 162 is rendered inoperative under the control of the position limit cam 190 and associated contacts 154 as long as the potentiometer shaft 49 remains at the upper end of its operative range. The motor control winding 162 is returned to the control of the relay 40 only after the potentiometer shaft 49 is moved away from the upper end of its operative range. This result is obtained by transmitting a third ultra-sonic signal to effect the operation of the down relay 42 and, thus, the energization of the motor control winding 168. Incident to energization of the motor control winding 168, the potentiometer shaft 49 is moved away from the upper end toward the lower end of its operative range, with the result that the cam 190 is displaced to permit the contacts 154 to close. The closure of the contact 154 thus returns the operation of the motor control winding 162 to the control of the up relay 40 and, as long as the potentiometer shaft 49 remains in the middle of its operative range, the relay 40 exclusively controls the energization of the motor control winding 162.

It will be appreciated that the motor control winding 168 is also rendered inoperative when the potentiometer shaft 49 is at the lower end of its operative range since the position limit cam 192 on the control shaft 92 opens the contacts 176 and, thus, opens the energizing circuit for the motor control winding 168. The successive transmission of third ultra-sonic signals repeatedly operates the down relay 42 but does not effect the energization of the motor 38. The contacts 176 are closed only after a second ultra-sonic signal is transmitted to operate the relay 40 and energize the motor control winding 162, whereby the potentiometer shaft 49 is moved away from the lower end toward the upper end of its operative range. This movement of the potentiometer shaft 49 causes the cam 192 to be displaced to permit the contacts 176 to be closed, whereby the operation of the motor control circuit 168 is returned to the control of the relay 42 and its associated contacts 170.

If it is desired to change the channel to which the television receiver is tuned when the volume control is conditioned to be remotely controlled, the transmitter 24 is operated to cause the channel-volume selector resonator rod 70 to radiate a first ultra-sonic signal. The first ultrasonic signal, as indicated above, causes the discriminator 78 to supply a D.C. pulse to the conductor 27 and thus the grid of the control tube 79. The tube 79 is rendered conductive to complete the energizing circuit for the relay 30, whereby the relay armature 100 is actuated to cause the angulated finger 102a of the arm 102 to move downwardly into the arm portions 104c which, as described above, is located immediately beneath the angulated finger 102a when the rocker 86 is in its FIG. 2 position. The arm portion 104c guides the angulated finger 102a against its end 109 (see FIG. 2) to cause the rocker 86 to move from the position illustrated in FIG. 2 toward its other operative position (not shown). When the rocker 86 moves beyond its center position, the over-center spring arrangement 106 coacts with the angulated finger 102a to move it to its operative position (not shown).

This movement of the rocker 86 causes the gear train 90 to be rendered ineffective by displacing the gear 122 upwardly out of driving engagement with the axially movable pinion gear 39 and further causes the gear train 94 to be rendered effective by displacing the gear 123 downwardly into its operative position to be drivingly engaged by the axially movable driving pinion 39. However, similar to the gear train 90, the gear train 94, at this time in its effective position is neither driven by the motor 38 nor is in driving engagement with the pinion gear 39 of the motor 38. In short, as described above, the transmission of the first ultra-sonic signal only selects either the volume or channel selection control function for remote operation and does not in any way change the operative condition of either the volume or channel selection control function.

The movement of the rocker 86 into its operative position (not shown) additionally causes the volume control window 132 to be darkened and the channel-selection window 132a to be illuminated. Specifically, the switch 134 actuated by the rocker 86 opens the contacts 134a and closes the contacts 134b. The opening of the contacts 134a opens the above-described energizing circuit for the bulb 136b, while the closure of the contacts 134b completes an energizing circuit for the bulb 132a, as follows: the six-volt A.C. source, the conductor 138, a conductor 141, the bulb 136a, a conductor 139, the contacts 134b, and the conductor 142 connected to the six-volt source. Consequently, the operator of the transmitter 24 is informed that the control system 22 has selected the channel-selection control function to be remotely adjusted.

Once the channel-selection control function is selected the television receiver 20 can be tuned to either a higher or a lower channel. If it is desired to tune the receiver 20 to a higher channel, the transmitter 24 is operated to cause the resonator rod 71 to transmit a second ultra-sonic signal. This second ultra-sonic signal, as described above, causes the relay 40 to operate and its contacts 143 to close, thereby to complete the above-described energizing circuit for the motor control winding 162. Incident to energization of the motor 38, the motor driving shaft 38a simultaneously rotates in a clockwise direction and moves axially upward so that the pinion gear 39 moves into engagement with the input gear 123 of the gear train 94. The clockwise rotation of the motor driving shaft 38a causes the control shaft 96 to rotate in a counterclockwise direction and, assuming that the mechanical connection 97 between the control shaft 96 and the main tuning shaft 45 provides a direct driving connection, the main tuning shaft 45 can be considered as also rotating in a counterclockwise direction.

In contrast to the incremental adjustment of the potentiometer shaft 49 in the audio circuit 48, the main tuning shaft 45 is rotated under the control of a programming mechanism 194 to assure that the main tuning shaft 45 is moved directly to an adjacent transmitting channel for the area in which the television receiver 20 is located. In this connection, the programming mechanism 194 comprises thirteen cam buttons 195 mounted on a wheel 196 fixedly secured to the control shaft 96, the cam buttons 195 coacting with a cam follower 197 that controls contacts 198 and 200. The cam buttons are referred to collectively as 195 and individually as 195–1, 195–2, 195–3, 195–4, 195–5, 195–6, 195–7, 195–8, 195–9, 195–10, 195–11, 195–12, and 195–13, the buttons 195–1, 195–2, 195–3, 195–4, 195–5, 195–6, 195–7, 195–8, 195–9, 195–10, 195–11, 195–12, 195–13, corresponding to channels 1, 2, 3, etc. In the Chicago area, for example, channels 2, 5, 7, 9 and 11 are used and, hence, the buttons 195–2, 195–5, 195–7, 195–9 and 195–11 have outwardly extending cylindrical camming portions to move the cam follower 197 radially outwardly to effect the opening of the contacts 198 and 200, while the buttons 195–1, 195–3, 195–4, 195–6, 195–8, 195–10, 195–12, and 195–13 are flattened to permit the cam follower 197 to move radially inwardly to effect the closure of the contacts 198 and 200. It may be assumed that prior to transmission of the second ultra-sonic signal, the programming mechanism 194 is in the position shown in FIG. 2 and, thus, the television receiver 20 is tuned to channel 2. As shown, the cam follower 197 coacts with the camming button 195–2 whereby the contacts 198 and 200 are maintained opened.

Incident to transmission of the second ultra-sonic signal which effects the operation of the motor 38, the control shaft 96 rotates in a counterclockwise direction to cause the button 195–2 to move counterclockwise out of engagement with the cam follower 197. The cam follower 197, being inherently resiliently-biased toward the cam buttons 195, moves into engagement with the flattened portion of the button 195–3, thereby to close the contacts 198 and 200, the contacts 198 and 200 being closed during the transmission of the second ultra-sonic signal. The closure of the contacts 198 performs no useful function since the frictional cam 159 mounted on the motor shaft 38a opens the contacts 182 when the motor driving shaft 38a rotates in a clockwise direction to prevent either the energizing circuit or the holding circuit for the motor control winding 168 from being completed. By this arrangement, both of the control windings 162 and 168 can never be simultaneously energized as a result of the operation of the transmitter 24 or the programming mechanism 194. The closure of the contacts 200 completes a holding circuit for the motor control winding 166, as follows: ground, cam follower 197, contacts 200, conductor 202, the conductor 157, the contacts 158, conductor 160, the motor control winding 162, the conductor 164, the A.C. source 166, and ground. Accordingly, the above-described holding circuit energizes the motor control winding 162 independently of the above-described energizing circuit controlled by the relay 40 and its associated contacts 148. Some time after the holding circuit is completed, the transmission of the second ultra-sonic signal is ended with the result that the up relay 40 is deenergized and its contacts 148 are opened. The opening of the contacts 148 opens the energizing circuit for the motor control winding 162 but, since the above-described holding circuit is completed under the control of the programming mechanism 194, the motor control winding 162 remains energized and the motor 38 continues to drive the main tuning shaft 45.

Returning to the operation of the programming mechanism 194, the counterclockwise movement of the control shaft 96 and the main tuning shaft 45 continues until the cam button 195–5 moves into engagement with the cam follower 197, whereby the cam follower 197 is cammed radially outwardly to effect the opening of the contacts 198 and 200. The opening of the contacts 200 opens the holding circuit for the motor control winding 162 and causes the deenergization of the motor 38. Thus, the motor 38 is deenergized under the control of the programming mechanism 194 and the pinion gear 39 moves axially downward into its inoperative position to break the driving connection between the motor 38 and the main tuning shaft 45, with the result that the movement of the tuning shaft 45 is arrested.

If it is desired to tune the television receiver to channel 7 when the receiver is tuned to channel 5, the transmitter 24 is operated to cause the resonator 71 to transmit another second ultra-sonic signal. This second ultra-sonic signal causes the relay 40 to operate and its contacts 148 to close, thereby to complete the above-described energizing circuit for the motor control winding 162. Incident to energization of the motor 38, pinion gear 39 again drivingly engages the gear train 94 to cause the control shaft 96 and main tuning shaft 45 to rotate in a counterclockwise direction. The counterclockwise rotation of the control shaft 96 causes the button 195–5 to move out of engagement with the cam follower 197, whereby the resilient cam follower 197 moves into engagement with the flattened part of the button 195–6 to effect the closure of the contacts 198 and 200. As previously described, the closure of the contacts 198 performs no useful function, while the closure of the contacts 200 completes the holding circuit for the motor control winding 162. While the cam follower 197 engages the button 195–6, the transmission of the second ultra-sonic signal is stopped with the result that the relay 40 is deenergized and its contacts 148 opened. The opening of the contacts 148 opens the energizing circuit for the motor control winding 162 but, since the holding circuit remains closed under the control of the programming mechanism 194, the motor 38 remains energized. When the button 195–7 moves into engagement with the cam follower 197, the cam follower 197 moves radially outward to open the contacts 200 and to open-circuit the holding circuit for the motor control winding 162. The motor 38 is thus deenergized and the movement of the tuning shaft 45 is arrested in its channel 7 position.

On the other hand, if it is desired to tune the television receiver to channel 2 when the receiver is tuned to channel 5, the transmitter 24 is operated to cause the resonator rod 72 to transmit a third ultra-sonic signal. This third ultra-sonic signal causes the operation of the relay 42 and the closure of its contacts 170. The closure of the contacts 170 completes the above-described energizing circuit for the motor control winding 168, whereby the motor driving shaft 38a simultaneously rotates counterclockwise and moves axially upward so that the pinion gear 39 drivingly engages the input gear 123 of the gear train 94. The counterclockwise movement of the pinion gear 39 of the motor shaft 38a causes the control shaft 96 and the main tuning shaft 45 to rotate in a clockwise direction. The clockwise movement of the control shaft 96 causes the cam button 195–5 to move out of engagement with the cam follower 197, whereby the resilient cam follower 197 moves radially inward into engagement with the flat part of the button 194–4 to effect the closure of the contacts 198 and 200, as described above. The closure of these contacts 198 and 200, as stated above, occurs during the transmission of the third ultra-sonic signal. Specifically, the closure of the contacts 200 performs no useful function at this time, since the friction cam 159 mounted on the motor shaft 38a opens the contact 158 in the holding circuit for the motor control winding 162 when the motor driving shaft 38a rotates in a counterclockwise direction. The closure of the contacts 198, however, completes a holding circuit for the motor control winding 168 as follows: ground, cam follower 197, contacts 198, conductor 204, the conductor 180, the contacts 182, the conductor 184, the motor control winding 168, the conductor 164, the A.C. source 166, and ground.

During the clockwise movement of the programming mechanism 194, i.e., when the cam follower 197 coacts with the flat portion of the buttons 195–4 and 195–3, the transmission of the third ultra-sonic signal is ended with the result that the relay 42 is deenergized and its associated contacts 172 are opened. The opening of the contacts 172 opens the energizing circuit for the motor control winding 168 but, since the holding circuit is completed under the control of the programming mechanism 196, the motor remains energized. When the button 195–2 moves into engagement with the cam follower 197, the cam follower 197 moves outwardly to open the contacts 198, whereby the holding circuit for the motor control winding 168 is opened. Accordingly, the motor 138 is deenergized and the main tuning shaft 45 is stopped in its channel 2 position.

In the event it is desired to tune the receiver 20 to channel 9 when it is tuned to channel 2 and assuming that there are stations transmitting in channels 2, 5 and 7, the transmitter 24 is operated to radiate a second ultra-sonic signal to effect the movement of the main tuning shaft 45 from its channel 2 position to its channel 5 position under the control of the programming mechanism 194. After the operation of the programming mechanism is completed, the transmitter 24 is operated again to transmit another second ultra-sonic signal. This ultra-sonic signal causes the programming mechanism 194 to move the main tuning shaft 45 from its channel 5 to its channel 7 position. Thereafter, the transmitter 24 is operated again to transmit still another second ultra-sonic signal to cause the programming mechanism 194 to move the main tuning shaft 45 from its channel 7 to its channel 9 position. It should be understood that it is necessary that the successive ultra-sonic signals radiated from either the up or down resistor rods 71 or 72 be transmitted after the programming mechanism 194 completes its operation—otherwise the up relay 40 or the down relay 42 are energized and deenergized prior to completion of the operation of the programming mechanism 194 and have no effect on the motor control windings 162 and 168.

It will be appreciated that when the potentiometer shaft 49 is at either the upper or lower end of its range so that the position limit cams 190 or 192 open the contacts 154 or 176, the receiver 20 could not be tuned to a lower or a higher channel, respectively, were it not for an interlock arrangement, identified generally as 206. Specifically, when the potentiometer shaft 49 is at the upper end of its range, the contacts 154 are opened and, in the absence of the interlock arrangement 206, the energizing circuit for the motor control winding 162 would be opened. Accordingly, if the channel control function is selected, the motor control winding 162 could not be energized to tune the receiver 20 to an adjacent higher channel, since the motor control winding 162 is open-circuited by the opened contacts 154. To obviate this undersirable result, the interlocking arrangement 206 effectively short-circuits the contacts 154 and 176 when the rocker 86 is in its operative position (not shown) and the control shaft 96 is conditioned to be driven by the motor 38. To this end, a cam 208 is fixedly secured to the rocker 86 to coact with the contacts 210 and 212. The contacts 210 are electrically connected across the contacts 154 by conductors 214 and 216, while the contacts 212 are electrically connected across the contacts 176 by conductors 218 and 220. Hence, assuming that the volume control function is selected and that the potentiometer shaft 49 is at the upper end of its range so that contacts 154 are opened, the transmission of a first ultra-sonic signal causes the rocker 86 to move from its FIG. 2 position into its operative position (not shown), with the result that the cam 208 moves upwardly to effect the closure of the contacts 210 and 212. The closure of the contacts 210 completes the shunt-circuit across the opened contacts 154 so that the energization of the motor control winding 162 is placed under the control of the relay 40 and its associated contacts 148 only, while the closure of the contacts 212 completes the shunt circuit across the contacts 176 so that the energization of the motor control winding 168 is placed under the control of the down relay 42 and its associated contacts 170 only. Hence, even though the potentiometer shaft 49 is at the upper end of its range, the transmission of a second ultra-sonic signal causes the relay 40 to operate and its associated contacts 148 to close, thereby to complete the energizing circuit for the motor control winding 162 through the shunt-circuit across the contacts 154 comprising conductor 214, contacts 210, and conductor 216. Consequently, the motor control winding 162 is energized independently of the position limit cam 190 and its associated contacts 154 and remains energized under the control of the programming mechanism 194 to move the main tuning shaft 45 to an adjacent higher channel position.

On the other hand, assuming that the potentiometer shaft 49 is at the lower end of its range when it is desired to tune the receiver 20 to a lower channel, the transmission of a second ultra-sonic signal causes the relay 40 to operate and its associated contacts 148 to close, thereby to complete the energizing circuit for the motor control 168 through the shunt-circuit across the contacts 176 comprising the conductor 218, contacts 212, and conductor 220.

Thus, the motor control winding 168 is energized independently of the position limit cam 192 and its associated contacts 176 and remains energized under the control of the programming mechanism 194 to move the main tuning shaft 45 to an adjacent lower channel position.

The contacts 154 and 176 in the energizing circuits for the motor control windings 162 and 168 are rendered effective independently of the contacts 210 and 212 when the volume control function is again selected. In this connection, in response to a first ultra-sonic signal, the rocker 86 moves from its operative position (not shown) into its FIG. 2 position, whereby the cam 208 moves downwardly to effect the opening of the contacts 210 and 212. The opening of the contacts 210 and 212 opens the shunt circuits across the contacts 154 and 176, thereby to render the contacts 154 and 176 effective again. However, even though the potentiometer shaft 49 is at either the upper or lower end of its range so that either the contacts 154 or 176 are opened, the motor control winding 168 or motor control winding 162 can be energized by transmission of a third or second ultra-sonic signal, respectively, to effect the rotation of the shaft 49 away from the upper or lower end, respectively, of its range, thereby to open the contacts 154 or 176 and return the energization of the control windings 162 or 168 to the control of the up relay 40 or the down relay 42.

It should be appreciated that although the FIG. 2 embodiment has been described as controlling the channel selection and volume control functions of a television receiver, the FIG. 2 embodiment is designed to control any two control functions of the receiver 20. However, the channel selection and volume adjustment are the two most frequently changed control functions and have been used for illustrative purposes only.

In a slightly different form of the FIG. 2, three-button, incremental adjustment embodiment, three control functions instead of two control functions can be remotely controlled by the remote control system 22. In this connection, three gear trains, instead of two gear trains, are sequentially rendered effective under the control of a first relay similar to the selector relay 30, and are subsequently driven by a motor driving means under the control of two relays, similar to relays 40 and 42. Specifically, a stepper arrangement is substituted for the rocker 86 and in response to successive operations of the first relay, the three input gears of the three gear trains are sequentially moved downwardly into positions to be drivingly engaged by the driving means of the motor. To this end, the pinion gear on the motor and the input gears are of such relative size that three input gears can be oriented around the pinion gear of the motor at approximately 120° apart from one another. In fact, it will be appreciated that any number of gear trains can be provided to control all the manually adjustable control functions of the receiver 20, provided the pinion and input gears are properly dimensioned and that a properly designed stepper arrangement is used. With the three-gear train arrangement, the channel selection, volume, and fine tuning or contrast or brightness control functions, for example, can be remotely controlled by the remote control system 22. In any event, the desired control function is selected by successively radiating first ultrasonic signals, and once selected its operative condition is changed by successively radiating either second or the third ultra-sonic signals, as described above.

Figure 3:
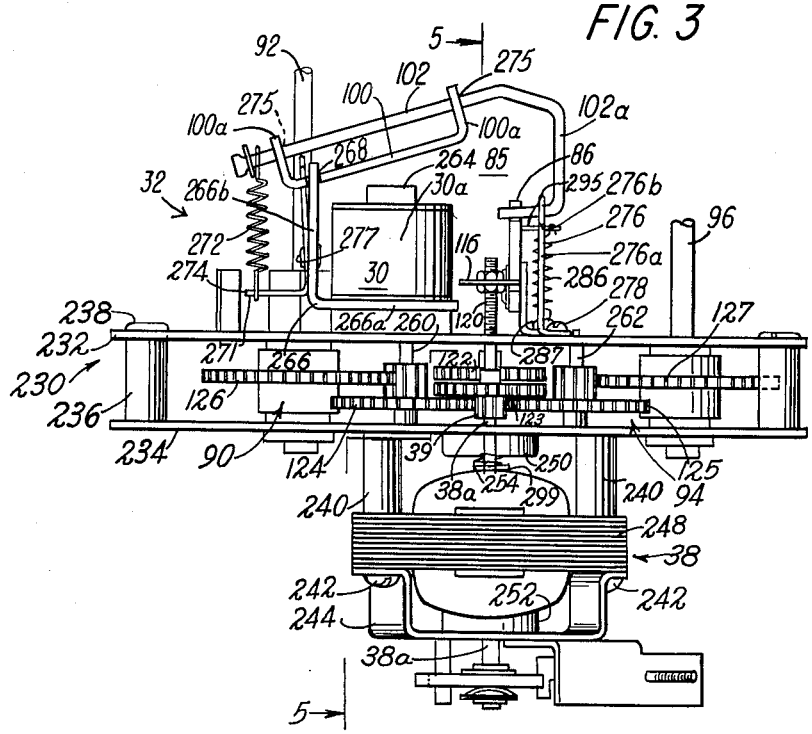
FIG. 3 is a front elevational view of a portion of the embodiment shown in FIG. 2.

Considering now the constructional details of the selector 32, the bidirectional motor 38, the gearing mechanism 88, and the rocker assembly 85 are fixedly secured to a frame 230 comprising a pair of spaced-apart plates 232 and 234. The plates 232 and 234 are maintained in fixed spaced-apart relation by a plurality of spacer sleeves 236 which are secured to and extend between the plates 232 and 234 by a plurality of fasteners 238. As best shown in FIG. 3, the core of the motor 38 is seated on a plurality of spaced-apart sleeve supports 240 to be spaced from the plate 234. The sleeve supports 240 respectively accommodate fasteners 242 which extend through aligned openings (not shown) defined in the plate 234, the motor core, and a motor bracket 244, the heads of the fasteners 242 being seated against the brackets 244 and the ends of the fasteners being peened over the upper surface of the plate 234 thereby to fixedly secure the motor 38 to the frame 230. An aperture (not shown) is provided in the plate 234 to permit mechanical interconnection between the motor 38 and the gearing means 88 located between the plates 232 and 234.

The electric motor 38 comprises a four pole, A.C., squirrel-cage motor which is energized under the control of the relays 40 and 42 to effect, respectively, clockwise and counterclockwise rotation of the motor output driving means comprising the output shaft 38a on which is mounted the output pinion gear 39. The pinion gear 39 and the output shaft 38a extend through and are axially movable with respect to plate 234, as described in detail hereafter, to drivingly engage selected gears in the gearing mechanism 88. The motor 38 includes the motor control winding 162 and the motor control winding 168 (FIG. 2) wound about its laminated core 248 (FIG. 3). The core 248 includes right-angularly related cross arms in which is defined pairs of opposing pole pieces (not shown) which have generally curved surfaces defining a cylindrical opening for a rotor (not shown). The rotor is fixedly mounted on the driving shaft 38a which, in turn, is rotatively supported from a pair of spaced-apart bearing assemblies 250 and 252 respectively secured to the plate 234 and the motor bracket 244.

Figure 5:
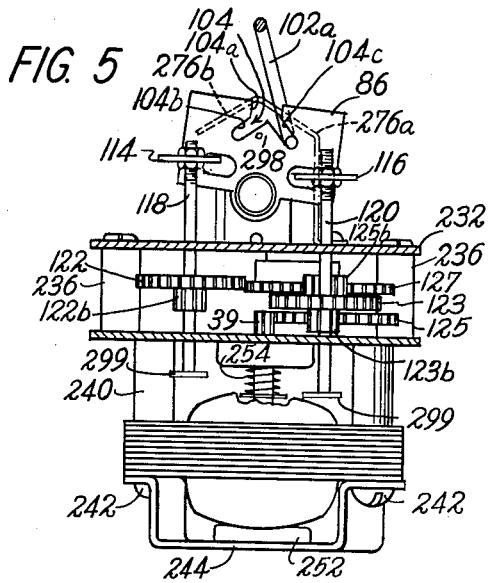
FIG. 5 is a sectional view taken along line 5—5 of FIG. 3, illustrating a rocker assembly as it renders effective one of the gear trains of a gearing mechanism.
Figure 7:
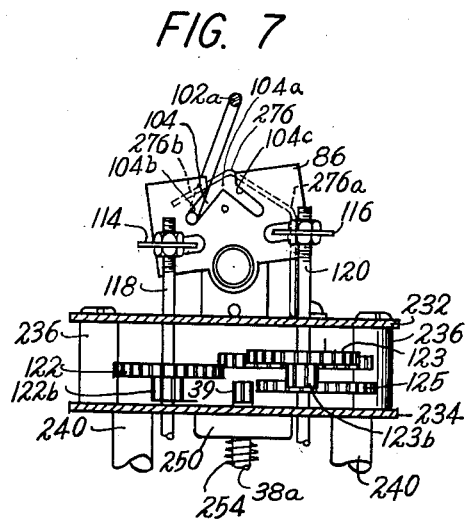
FIG. 7 is a fragmentary sectional view taken along line 5—5 of FIG. 3, illustrating the rocker assembly as it renders effective another gear train of the gearing mechanism.
Figure 8:
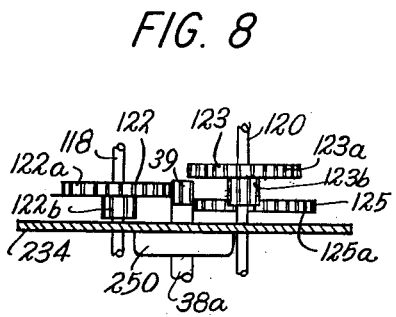
FIG. 8 is a fragmentary sectional view taken along line 5—5 of FIG. 3, illustrating the motor means in driving engagement with the effective gear train shown in FIG. 7.

In addition to the rotor being rotatively movable, it is also axially movable relative to the bearing assemblies 250 and 252. Specifically, the rotor is movable between an inoperative position, i.e., displaced from the pole pieces when the motor 38 is deenergized, and an operative position, i.e., in alignment with the pole pieces when the motor 38 is energized. The rotor is maintained in its downward inoperative position by a coil spring 254 wound about the output shaft 38a, the spring being located between the rotor and the bearing assembly 250, as shown in FIGS. 3, 5 and 7. However, when either of the control windings 162 or 168 are energized, the force of the spring is overridden and the rotor is drawn into the magnetic field developed across the pole pieces to assume an upward position centrally of the pole pieces. By the above construction, as the motor 38 is energized and deenergized, the rotor moves between its upward operative and downward inoperative positions, thereby to move the output driving shaft 38a and the output pinion gear 39 upwardly and downwardly relative to the gearing mechanism 88.

Considering now the gearing mechanism 88 in greater detail, it comprises, as stated above, a first gear train 90 for drivingly interconnecting the motor 38 with the control shaft 92 and a gear train 94 for drivingly interconnecting the motor 38 with the control shaft 96. The gear trains 90 and 94, respectively, include input gears 122 and 123 which are axially movable under the control of the rocker assembly 85. The gears are so controlled by the rocker assembly 85 that they are alternately moved into operative position to be drivingly engaged by the driving pinion 39 of the motor 38. With the rocker assembly in the operative position illustrated in FIG. 5, the axially movable pinion gear 39 is movable under the control of the motor 38 into driving engagement with the input gear 123 to cause rotation of the control shaft 96, the direction of rotation of the shaft 96 being dependent upon the direction of rotation of the pinion gear 39. However, when the rocker assembly 85 is in the position illustrated in FIG. 7, the pinion gear 39 is axially movable under the control of the motor 38 into driving engagement with the input gear 122 to cause rotation of the control shaft 92, the direction of the rotation of the shaft 92 being dependent upon the direction of rotation of the motor shaft 38a. Thus, prior to operation of the motor 38, the rocker assembly 85 is operated under the control of the relay 30 to render either the gear train 90 or the gear train 94 effective.

Considering now more specifically the gear trains 90 and 94 and considering first the gear train 90, the input gear 122 is fixedly secured to a spindle 118 which is journaled in the plates 232 and 234 for axial movement under the control of the rocker assembly 85. The input gear 122 comprises a spur gear 122a adapted to be drivingly engaged by the pinion gear 39 and, further, a pinion gear 122b drivingly connected to the spur gear 124a of the idler gear 124. The gear 124 is fixedly secured to a shaft 260 that is journaled in the plates 232 and 234. The gear 124 includes a pinion gear 124b in driving engagement with the gear 126 which is fixedly secured to the control shaft 92 suitably journaled in the plates 232 and 234. Similarly, the input gear 123 of the gear train 94 is fixedly secured to a spindle 120 which is journaled in the plates 232 and 234 for axial movement under the control of the rocker assembly 85. The input gear 123 includes a spur gear 123a adapted to be drivingly engaged by the pinion gear 39, and, further, a pinion gear 123b in driving engagement with the spur gear 125a of the idler gear 125. The idler gear 125 is suitably secured to a shaft 262 journaled in the plates 232 and 234 and includes a pinion gear 125b in driving engagement with the spur gear 127 fixedly secured to the control shaft 96. Similar to the control shaft 92, the control shaft 96 is journaled in the plates 232 and 234. As best seen in FIGS. 5 and 7, the spindles 118 and 120 are so spaced apart that the input gears 122 or 123 are positioned to be drivingly engaged by the pinion gear 39 as it is axially moved into its upward position by the motor 38. Hence, depending upon the position of the rocker assembly 85, either gear train 90 or 94 is rendered effective to be drivingly engaged by the motor 38 in order to provide a driving connection to either of the control shaft 92 or 96.

Figure 4:
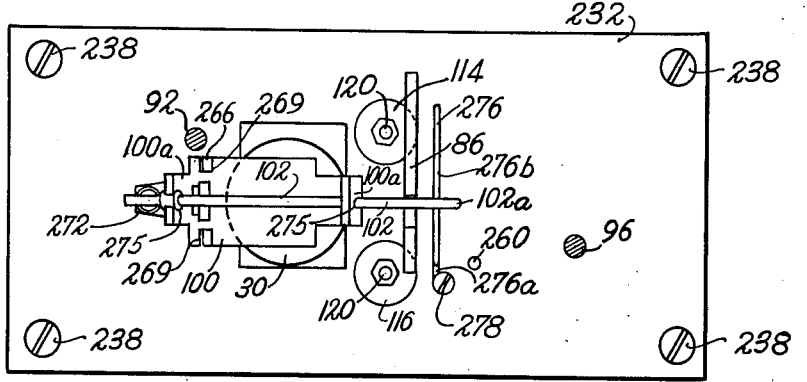
FIG. 4 is a top plan view of the structure shown in FIG. 3.

The rocker assembly 85 is controlled by the relay 30 which is suitably secured to the upper surface of the plate 232. The relay 30 includes a winding 30a wrapped around a cylindrical magnetic core 264 suitably secured to the horizontal leg 266a of an L-shaped magnetic structure 266. The vertical leg 266b includes a recessed portion 268 at its upper end to accommodate a pair of keyways 269 defined transversely in the armature 100 (see FIG. 4). The armature 100 is biased into its inoperative position illustrated in FIG. 3 by a coil spring 272 connected at its upper end to an arm 102 carried by the armature 100 and connected at its lower end to an angulated bracket 274 suitably secured by a fastener 277 to the vertical leg 265b. The armature 100 is generally U-shaped in section and includes a pair of apertures 275 defined in its arms 100a for accommodating the arm 102. The apertures 275 are oversized to permit the arm 102 to freely rotate relative to the armature 100. The arm 102 has a configuration best shown in FIG. 3 and includes an angulated finger 102a which coacts with an angulated wire 276 connected to the plate 232 by a fastener 278. The wire 276, as seen in FIG. 5, includes a vertical support portion 276a and a finger-engaging, inverted V-shaped portion 276b. The apex of the finger-engaging portion 276b coacts with the horizontal part of the angulated finger 102a when the relay 30 is deenergized and prevents the disassembly of the armature 100 and the armature structure 266. The wire 276 also functions to position the angulated finger 102a in a predetermined position relative to the rocker 86 when the relay 30 is deenergized. As shown in FIG. 3, the extreme tip of the angulated finger 102a coacts with the slot structure 104 provided in the rocker 86 so that incident to energization of the relay 30 the rocker 86 is actuated to render effective either the gear train 90 or the gear train 94.

Considering now the rocker 86 in greater detail, and referring primarily to FIGS. 5 and 7, the rocker 86 is pivotally supported on a pivot pin 87 suitably mounted to a bracket which is secured to the plate 232. The rocker 86, in addition to being controlled by the angulated finger 102a, is also controlled by an overcenter spring mechanism 106 interconnecting the rocker 86 and the plate 232. Thus, the rocker 86 pivots under the joint control of the angulated finger 102a and the over-center mechanism 106 between a position illustrated in FIG. 5 wherein it is inclined downwardly to the right and a position illustrated in FIG. 7 wherein it is inclined downwardly to the left. The over-center spring mechanism 106 includes a coiled spring 286 connected at its upper end to a hook 295 mounted adjacent the slot structure 104 at the upper portion of the rocker 86 and at its lower end to a stud 287 suitably secured to the plate 232. By this arrangement, the rocker 86 moves into either of its FIG. 5 or FIG. 7 positions after it passes its center position under the joint control of the compressive force of the spring 286 and the angulated finger 102a. Moreover, the spring 286 acts to bias the rocker 86 into its FIG. 5 and FIG. 7 positions after it is moved between these positions and, accordingly, the relay armature 100 must develop enough force to overcome the force of the spring 286 in order to move the rocker 86.

The pivotally movable rocker 86 is mechanically connected to the input gears 222 and 223, respectively, and, thus, effects the necessary vertical displacement of the input gears 122 and 123 incident to operation of the relay 30. The displacement of the rocker 86 is transmitted to the input gears 122 and 123 by spindle and disc arrangements. To this end, there is defined in the vertical edges of the rocker 86, as seen in FIG. 2, a pair of horizontally extending openings 110 and 112, respectively, which include reduced neck portions adjacent the outer ends of the openings. The openings 110 and 112 respectively accommodate discs 114 and 116 which are fixedly secured to the spindles 118 and 120, respectively. Since the spindles 118 and 120 rotate when the respective gear train 90 or 94 is rendered operative, the neck portions of the openings 110 or 112 provide bearing surfaces for the rotating discs 118 and 120, respectively. Further, the neck portions are so configured that unencumbered rotation of the discs 118 and 120 is permitted, irrespective of the position of the rocker 86.

Furthermore, the discs 114 and 116 are so located on the spindles 118 and 120, respectively, that when the rocker 86 is in its FIG. 5 position, the input gear 123 of the gear train 94 is in its downward operative position to be drivingly engaged by the axially movable pinion gear 39, while the gear 122 of the gear train 90 is in its upward inoperative position out of driving engagement with the axially movable pinion gear 39. Conversely, with the rocker 86 in its FIG. 7 position, the input gear 122 of the gear train 90 is in its downward operative position to be drivingly engaged by the axially movable pinion gear 39, while the input gear 123 of the gear train 94 is in its upward inoperative position out of driving engagement with the axially movable pinion gear 39.

Referring now to the operation of the relay 30 and its actuation of the rocker assembly 85, the rocker 86 is moved between its operative positions shown in FIGS. 5 and 7 under the joint control of the angulated finger 102a and the spring mechanism 106. As indicated above, the angulated finger 102a coacts with the slot structure 104 which is of generally inverted Y configuration and specifically includes a vertically extending leg portion 104a extending into a downwardly and leftwardly extending arm portion 104b and a downwardly and rightwardly extending arm portion 104c. The portions 104b and 104c define therebetween a generally triangular portion 298 having an apex located along the center line of the vertical leg portion 104a. When the relay 30 is deenergized and the rocker 86 is in either its FIG. 5 or FIG. 7 position, the angulated finger 102a seats in the apex of the horizontal portion 276b of the wire 276. As clearly seen in FIGS. 5 and 7, the triangular part 298 of the rocker 86 is displaced on either side of the angulated finger 102a so that incident to downward movement of the armature 100, the finger 102a passes into either the slot 104b or 104c, thereby to move the rocker out of its FIG. 7 or FIG. 5 position. More specifically, assuming that the rocker 86 is in its FIG. 5 position, it will be observed that the part 298 of the rocker 86 is located to the right of the angulated finger 102a seated in the apex of the wire portion 276b. Thus, the downwardly moving finger 102a passes downwardly through the leg portion 104a and into the arm portion 104b with the result that the finger 102a moves downwardly to the left to engage the end part 108 of the arm portion 104b and rock the rocker 86 out of its FIG. 5 position. During this movement, the finger 102a and in fact the entire arm 102 is rotated relative to the armature 100. Conversely, with the rocker 86 in its FIG. 7 position, it will be observed that the triangular part 298 is located to the left of the angulated finger 102a seated in the apex of the wire portion 276b. Thus, the downwardly moving angulated finger 102a passes downwardly through the leg portion 104a into the arm portion 104c, with the result that the angulated finger 102a moves downwardly to the right to engage the end part 109 or the arm portion 104c to rock the rocker 86 out of its FIG. 7 position. As the finger 102a moves through the arm portion 104c, the entire arm 102 is rotated relative to the armature 100.

Returning now to the movement of the rocker 86 from its FIG. 5 to its FIG. 7 position, when the rocker 86 moves beyond its over-center position, the over-center spring mechanism jointly with the angulated finger 102a moves the rocker 80 into its FIG. 7 position. As is well known, the compressive force of the spring 286 acts on the pin 295 at the upper end of the rocker 86 to pivot the rocker 86 into its FIG. 7 position. Incident to de-energization of the relay 30, the armature 100 moves upwardly under the control of the coiled spring 272, whereby the angulated finger 102a freely passes upwardly through the arm portion 104b and the leg portion 104a to engage the apex of the wire portion 276b. The arm 102, during its upward movement, rotates relative to the armature 100.

Figure 6:
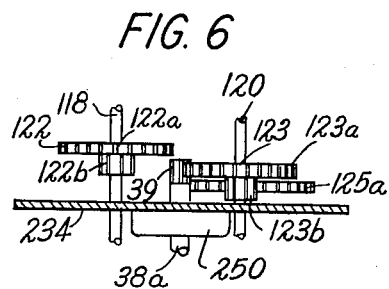
FIG. 6 is a fragmentary sectional view taken along line 5—5 of FIG. 3, illustrating a motor means in driving engagement with the effective gear train shown in FIG. 5.

In operation, assuming that the rocker assembly 85 is in the position illustrated in FIG. 7 and that counterclockwise rotation of the control shaft 96 is desired, the relay 30 is operated to cause the rocker 86 to move from the position illustrated in FIG. 7 to the position illustrated in FIG. 5. Thereafter, the motor 38 is energized so as to cause a clockwise rotation of the pinion gear 39. Incident to energization of the motor, the motor shaft 38a and associated pinion gear 39 simultaneously rotate in a clockwise direction and move axially from the position illustrated in FIG. 5 to the position illustrated in FIG. 6, wherein the pinion gear 39 drivingly engages the input gear 123 of the gear train 94. The driving connection from the motor 38 to the control shaft 92 is as follows: the pinion gear 39, the spur gear 123a, the pinion gear 123b, the spur gear 125a, the pinion gear 125b, the spur gear 127, and the control shaft 96. With the above-described connection, the control shaft 96 rotates in a counterclockwise direction at a constant speed determined by the rated speed of the motor 38 and the gear reduction of the gear train 94. In the event that a clockwise rotation of the control shaft 96 is desired, the motor 38 is so energized that counterclockwise rotation of the pinion gear 39 is obtained.

In order to stop the rotation of the control shaft 96, the motor 38 is deenergized with the result that the magnetic field developed across the pole pieces collapses and the rotor axially moves under the control of the spring 254 to its inoperative position, partially displaced downwardly from the pole pieces. Accordingly, the motor output shaft 38a and the pinion gear 39 move axially into the position shown in FIG. 5 out of driving engagement with the input gear 123.

In the event that counterclockwise rotation of the control shaft 92 is desired, the relay 30 is operated to cause the rocker assembly 85 to move from the position illustrated in FIG. 5 to the position illustrated in FIG. 7. Thereafter, the motor 38 is energized so that the pinion gear 39 simultaneously rotates in a clockwise direction and moves axially into driving engagement with the input gear 122 of the gear train 90. The drive connection from the motor 38 to the control shaft 92 is as follows: the spur gear 122a, the pinion gear 122b, the spur gear 124a, the pinion gear 124b, the spur gear 126, and the control shaft 92. With the above-described connection, the control shaft 92 rotates in a counterclockwise direction at a constant speed determined by the rated speed of the motor 38 and the gear reduction of the gear train 90. On the other hand, if clockwise direction of the control shaft 92 is desired, the motor 38 is energized so that counterclockwise rotation of the pinion gear 39 is obtained.

In a selector 32 built in accordance with the principles of the present invention, it has been observed that infrequently there is a tendency for the pinion gear 39 during its axial movement to abut the sides of the input gears and move them upwardly out of driving engagement with the pinion gear 39. This operation is occasionally achieved even though the teeth of the pinion gear 39 are slightly tapered adjacent its upper end to facilitate meshing with the teeth on the input gears 122 or 123. In order to maintain the input gears 122 or 123 in their respective operative positions, the spring 286 embodied in the over-center mechanism 106, acting in tension, positively biases the input gears 122 or 123 into their operative positions. Thus, when the teeth of the pinion gear 39 abut against the sides of the teeth of the input gears 122 or 123, the biased input gears 122 or 123 oppose the axial movement of the gear 39 and are moved only slightly upwardly until the teeth on the rotating pinion gear 39 mesh with the input gear.

In addition to the input gears 122 and 123 being maintained in their operative positions by the over-center mechanism 106 during driving engagement with the pinion gear 39, the input gears 122 and 123 are also maintained in their operative positions electromagnetically. In this connection, plates 299, made of magnetic material or the like are suitably secured to the lower ends of the axially movable spindles 118 and 120. Thus, when the spindle 118 or 120 is in its downward operative position as shown in FIG. 5 or FIG. 7, the corresponding plate 299 is positioned within the electro-magnetic field developed by the control windings of the motor 38, with the result that the magnetic flux lines produce in the spindle 118 or 120 a downward force which opposes the axial movement caused by the pinion gear 39.

Referring now to the FIG. 10, four-button incremental adjustment embodiment of the present invention, attention is directed to FIG. 9 wherein the remote control system is illustrated diagrammatically and is generally identified by reference numerals 322. The remote control system 322, similar to the above-described remote control system 22, includes a portable transmitter 324 adapted to transmit ultra-sonic signals to a control system 323 associated with a television receiver 20. The transmitter 324 is similar to construction and operation of the previously-described transmitter 24, with the exception that it functions to radiate four ultra-sonic signals instead of three ultra-sonic signals, the four ultrasonic signals having the following frequencies: 38.285 kc., 39.285 kc., 40.805 kc. and 41.805 kc. The control system 323 includes a microphone 326 which converts the ultrasonic signals into electrical signals as described above. The electrical signals are fed into a four-frequency selective amplifier network 328, similar in construction and operation of the above-described amplifier network 28. In response to the transmission of the first, second, third, and fourth ultra-sonic signal, the amplifier network 328 causes conductors 327, 329, 331 and 333, respectively, to be energized with D.C. pulses. The conductors 327, 329, 331 and 333 are respectively electrically connected to a channel-up relay 330, a channel-down relay 332, a volume-up relay 334, and a volume-down relay 336. Each of these relays 330, 332, 334, and 336 operates, in response to the transmission of one of the above ultrasonic signals, to simultaneously operate both a selector 38 and a prime mover 340. In contrast with the FIG. 2, three-button incremental adjustment embodiment wherein the selector 32, in response to one ultrasonic signal first conditions one control function for remote operation and thereafter is operated by the prime mover 38, in response to a different ultra-sonic signal, to adjust the condition of the selected control function, in the FIG. 10, four-button, incremental adjustment embodiment, the selector 338 and prime mover 340 are simultaneously operated in response to the transmission of only one of four distinguishable ultra-sonic signals to produce a predetermined output from the selector 338 to adjust the operative condition of one control function. Similar to the FIG. 2 embodiment, however, the repetitive transmission of one of the four ultra-sonic signals successively changes the operative condition of either the channel or volume control function of the television receiver 20.

Considering now the FIG. 10 four-button incremental adjustment embodiment in greater detail and referring specifically to FIG. 10, the transmitter 324 is of the acoustic resonator type and comprises four resonator rods 370, 371, 372, and 373 individually supported from a casing 374 and identified as a channel-up rod 370, channel-down rod 371, volume-up rod 372, and volume-down rod 373. As above, each of the resonator rods 370, 371, 372 and 373 is adapted to be shock-excited by a manually-operable hammer or the like (not shown) to produce an ultra-sonic signal. The signals transmitted by the rods 370, 371, 372 and 373 have, for example, the following frequencies: 38.285 kc., 39.285 kc., 40.805 kc. and 41.805 kc., these ultra-sonic signals being referred to hereafter as first, second, third, and fourth ultra-sonic signals. As previously suggested, the first and second ultra-sonic signals effect the operation of the channel-up relay 330 and the channel-down relay 332 to cause the control system 323 to tune the receiver 20 to either a higher or lower channel. Moreover, successively transmitted first or second ultra-sonic signals cause the control system 323 to directly tune the television receiver 20 to the desired higher or lower channel. On the other hand, the third and fourth ultra-sonic signals effect the operation of the volume-up relay 334 and the volume-down relay 336, respectively, to cause the control system 322 to increase or decrease the operative condition of the volume control function. Accordingly, the third or fourth ultra-sonic signals are successively transmitted until the desired sound level of the receiver is obtained.

Each of the first, second, third, and fourth ultra-sonic signals radiated by the resonator bars 370, 371, 372 and 373 is detected by the microphone 326 embodied in the input circuit of the control system 323. The electrical output of the microphone 326 is coupled to a four-frequency selective amplifier network 328 which includes an amplifier, similar to the above-described amplifier 76, for amplifying the low level signal developed by the microphone 326. These electrical signals amplified by the amplifier are fed into a discriminator similar to the above-described discriminator 78. However, in contrast to the above-described discriminator 78, the discriminator causes a D.C. pulse to be supplied to the conductor 327 in response to the first ultra-sonic signal, a D.C. pulse to be supplied to the conductor 329 in response to a second ultra-sonic electrical signal, a D.C. pulse to be supplied to the conductor 331 in response to a third ultra-sonic signal, and a D.C. pulse to be supplied to the conductor 333 in response to a fourth ultra-sonic signal. The conductors 327, 329, 331 and 333 are respectively connected to the grids of negatively-biased, control tubes 379, 380, 381 and 382 which are rendered conductive by the application of D.C. pulses to their respective grids. As shown, the plate circuits of the control tubes 379, 380, 381 and 382, respectively, include the control windings 330a, 332a, 334a, and 336a, of the channel-up relay 330, the channel-down relay 332, the volume-up relay 334, and the volume-down relay 36.

As mentioned above, each of the relays 330, 332, 334 or 336 operates to actuate the selector 338 and simultaneously to electrically energize the prime mover 340. The selector 338 comprises a rocker assembly including a rocker 386 mechanically associated through spindle and disc arrangements, similar to the arrangements described above, with gear trains 390 and 394 of gearing mechanism 388, the gear trains 390 and 394 being identical in construction and operation to the above-described gear trains 90 and 94. More specifically, the rocker 386 is substantially identical in construction and operation to the rocker 86, and is moved into a first operative position (not shown) under the control of either the channel-up relay 330 or the channel-down relay 332 and is moved into its other operative position, shown in FIG. 10, under the control of the volume-up relay 334 or the volume-down relay 336. As a result of the operation of either of the channel relays 330 or 332, the rocker 386 renders the gear train 390 effective and energizes the prime mover 340 comprising a conventional electric motor to provide a driving connection with a control shaft 392 mechanically connected as indicated by the dotted line 393 to a volume potentiometer shaft, identical to the potentiometer shaft 49 located in the audio circuit 48 of the television receiver 20. Since the receiver is shown in block form in FIG. 2 with the shaft 49, the potentiometer shaft controlled by the FIG. 10 embodiment is hereinafter identified as 49. As a result of the operation of either of the volume relays 334 or 336, the rocker 386 renders the gear train 394 effective and energizes the electric motor 340 to provide a driving connection with a control shaft 396 mechanically connected as indicated by the dotted line 397 to main tuning shaft (not shown) of the receiver circuit 44 of the television receiver 20, the main tuning shaft being hereafter identified as 45. Since the rocker assembly of the selector 338 and the motor 340 are simultaneously operated under the control of each of the relays 330, 332, 334 and 336, the motor 340 drives either the main tuning shaft 45 or the potentiometer shaft 49 in a direction corresponding to the direction in which the motor 340 is rotated. Actually, the channel-up relay 330 and the volume-up relay 334 each energizes the motor 340 so that its driving shaft 340a drives either the main tuning shaft 45 so as to tune the receiver 20 to a higher channel or the potentiometer shaft 49 so as to increase the sound level of the receiver 20. On the other hand, the channel-down relay 332 and volume-down relay 336 each energizes the motor 340 so that its driving shaft 340a drives either the main tuning shaft 45 so as to tune the receiver 20 to a lower channel or the potentiometer shaft 49 so as to decrease the sound level of the receiver 20.

Assuming that the channel selection control function is selected and it is desired to increase the sound level of the television receiver 20, the transmitter 324 is operated to cause the volume-up resonator rod 372 to radiate a third ultra-sonic signal. The third ultra-sonic signal is converted by the microphone 326 into an electrical signal which is fed into the amplifier network 328. This electrical signal causes the discriminator to apply a D.C. pulse to the conductor 331, thereby to render the tube 381 conductive. The conductive tube 381 completes an energizing circuit for the relay 334, as follows: ground, control tube 381, conductor 385, relay winding 334a and B-plus. The operation of the relay 334 causes its armature 404 to move downwardly into engagement with a rod 410 fixedly secured to the left side of the rocker 386. The rocker 386, being pivotally mounted to a suitably supported pivot pin 387, moves from its operative position (not shown) toward its FIG. 10 operative position under the control of the relay 334. However, after the rocker 386 moves beyond its center position, an over-center spring mechanism 412 jointly controls the rocker 386 and moves it into its FIG. 10 position. This movement of the rocker 386 renders the gear train 394 ineffective and renders the gear train 390 effective, as described hereinafter.

The downwardly moving armature 404 of the volume-up relay 334, simultaneously with its actuation of the rocker 386, effects the energization of the motor 340. More specifically, the downwardly moving armature 404 closes a pair of contacts 422 to complete an energization circuit for a motor control winding 462 of the motor 340, as follows: ground, contacts 422, a conductor 423, contacts 424 controlled by a position limit cam 451 mounted on the control shaft 392, conductor 425, conductor 426, contacts 427 controlled by a friction cam 450 mounted on the motor shaft 440a, conductor 428, motor control winding 462, conductor 429, an A.C. source 430, and ground. The energization of the motor 340 causes its shaft 340a simultaneously to rotate in a clockwise direction and move axially in an upward direction as viewed in FIG. 10. Thus, the pinion gear 339 secured on the shaft 340a is rotated clockwise and axially moves into engagement with an input gear 405 of the gear train 390. Thus, in contrast to the previously described FIG. 2 embodiment wherein one of the gear trains is conditioned to be drivingly engaged by the subsequently energized motor, in the FIG. 10 embodiment the gear train 390 is rendered effective at the same time as the motor 340 is energized, thereby to immediately obtain a driving connection between the motor 340 and the control shaft 392.

Returning now to the operation of the rocker 386 resulting from the transmission of the third ultrasonic signal, the movement of the rocker 386 from the position (not shown) to the FIG. 10 operative position renders the gear train 394 ineffective by displacing its input gear 411 upwardly out of driving engagement with the axially movable pinion gear 339 and further renders the gear train 390 effective by displacing its input gear 405 downwardly to be drivingly engaged by the axially movable pinion gear 339. As illustrated, the rocker 386 is mechanically connected to the gear trains 390 and 394 through spindle and disc arrangements, identical in construction to the above-described spindle and gear arrangement of the FIG. 2 embodiment. To this end, the left and right edges of the rocker 386 are slotted to provide openings 432 and 434 which respectively accommodate suitable discs 436 and 438, the openings 432 and 434 and the discs 436 and 438 being identically constructed to the above described rocker openings 110 and 112 and discs 114 and 116. The discs 436 and 438 are fixedly secured to spindles 435 and 437, respectively, which are journaled in suitable means so as to permit rotation and axial movement of the spindles. The lower ends of the spindles 435 and 437, similar to the lower ends of the spindles 118 and 120, are secured to the input gears 405 and 411 of the gear trains 390 and 394, respectively. With the input gear 411 of the gear train 394 in its upward position, the axially movable pinion gear 339 is unable to engage and drive the gear train 394 comprising the input gear 411, idler gear 413 and spur gear 415 secured to the control shaft 396. However, with the input gear 405 of the gear train 390 in its downward position, it is readily engageable by the axially movable pinion gear 339 which moves into driving engagement with the gear 405 at about the same time that the gear 405 moves into its downward position. Accordingly, a drive connection is effected between the motor 340 and the volume potentiometer 49, as follows: the pinion gear 339, the input gear 405, an idler gear 407, a spur gear 409, the control shaft 392, and the mechanical connection 393 interconnecting the control shaft 392 and the potentiometer shaft 49. Thus, the clockwise rotating pinion gear 339 causes the potentiometer shaft 49 to rotate counterclockwise toward the upper end of its range to increase the output of the audio circuit 48 and, hence, the sound level of the receiver 20.

Similar to the FIG. 2, three-button, incremental adjustment embodiment, the potentiometer shaft 49 rotates only during the transmission of the third ultra-sonic signal and, accordingly, at the end of its transmission the relay 334 is deenergized so that the armature 404 moves upwardly to open the contacts 422 and open the energizing circuit for the motor control winding 462. Thus, the motor 340 is deenergized, the driving connection between the motor 340 and the gear train 390 is broken, and the movement of the potentiometer shaft 49 is stopped. It will be appreciated that the sound level of the receiver 20 is incrementally increased proportionately to the duration of transmission of the third ultra-sonic signal and if the sound level obtained is not high enough, it can be incrementally increased by successively transmitting third ultrasonic signals until the desired sound level is obtained.

In the event that it is desired to reduce the sound level of the receiver 20, the transmitter 324 is operated to cause the volume-down resonator rod 376 to radiate a fourth ultra-sonic signal. This ultra-sonic signal is converted by the microphone 326 into an electrical signal which is fed into the amplifier network 328. The discriminator supplies a D.C. pulse to the conductor 333 connected to the grid of the negatively-biased tube 382, thereby to render the tube 382 conductive and complete an energizing circuit for the volume down relay 336, as follows: ground, control tube 382, conductor 386, relay winding 336a, and B-plus. The operation of the relay 336 causes its associated armature 406 to move downwardly, but since the rod 410 was previously lowered by the relay 334 and is retained in its lowered position by the over-center spring arrangement 412, the downwardly moving armature 406 does not actuate the rocker 386. However, if the rocker 386 was in its operative position (not shown), the armature 406 would coact with the rod 410 to acuate the rocker 386 into its FIG. 10 position. In any event, the downwardly moving armature 406 does perform a useful function since it closes a pair of contacts 440 to complete an energizing circuit for the motor control winding 468 of the motor 340, as follows: ground, contacts 440, conductor 442, contacts 444 controlled by a cam 453 mounted on the control shaft 392, conductor 446, conductor 448, contacts 449 controlled by the friction cam 450 on the motor shaft 340a, conductor 452, control winding 468, conductors 429, the A.C. source 430, and ground. The energization of the motor control winding 468 causes the motor shaft 340a simultaneously to rotate in a counterclockwise direction and move axially upward into engagement with the input gear 405 of the gear train 390. Consequently, the pinion gear 339 rotates in a counterclockwise direction to effect a clockwise rotation of the control shaft 392, thereby to move the potentiometer shaft 49 toward the lower end of its range. At the end of the transmission of the fourth ultra-sonic signal, the relay 336 is deenergized, with the result that the contacts 440 are opened and the energizing circuit for the motor control winding 468 is likewise opened. Thus, the pinion gear 339 moves downwardly out of driving engagement with the input gear 405. With the driving connection broken, the movement of the potentiometer shaft 49 is arrested. As described above, the sound level of the receiver 20 is incrementally described and if the sound level obtained is not low enough, successive fourth ultra-sonic signals are transmitted to incrementally decrease the sound level until a desired volume is obtained.

In order to protect the volume potentiometer, which is adjustable over a range of approximately 320° and not throughout a range of 360°, the position limit switches 424 and 444 are connected in the energizing circuits for the motor control windings 462 and 468 to automatically open-circuit the motor 38 when the potentiometer shaft 49 reaches the respective ends of its range. To this end, the cams 451 and 453 are so located on the control shaft 492 that the contacts 424 and 444 are opened incident to movement of the potentiometer shaft 49 into the respective ends of its range.

For example, if the potentiometer shaft 49 reaches the upper end of its range when the third ultra-sonic signal is being transmitted, the cam 451 opens the contacts 424 to open-circuit the motor control winding 462. Hence, even though the relay 334 is operative to close the contacts 422, the motor 380 is deenergized and the driving connection between the motor 380 and the potentiometer shaft 49 is broken. Since the contacts 424 remain open under the control of the cam 451, successively radiated, third ultrasonic signals merely cause the relay 334 to operate but do not effect the energization of the motor 340. Consequently, the motor control winding 462 is rendered inoperative under the control of the cam 451 as long as the potentiometer shaft 49 remains at the upper end of its operative range. The control winding 462, however, returns to the control of the volume up relay 334 only after the potentiometer shaft 49 moves away from the upper end of its range. This result is obtained by transmitting a fourth ultra-sonic signal to effect the operation of the volume down relay 336 and the energization of the motor control winding 168, thereby to cause the potentiometer shaft 49 to move away from the upper end of its operative range toward its lowered end. This movement of the potentiometer shaft 49 causes the displacement of the cam 451 and the closure of the contacts 424, whereby the energization of the motor circuit 462 is returned to the control of the volume up relay 334 and its associated contacts 422. As long as the potentiometer shaft 49 is in the middle of its range, the relay 334 exclusively controls the energization of motor control winding 462.

It will be appreciated that the motor control winding 468 is also rendered ineffective when the potentiometer shaft 49 moves into the lower end of its range since the cam 453 on the control shaft 392 opens the contacts 444 to open the energizing circuit for the motor control winding 468. Similar to that described above, the contacts 444 are closed only after a third ultra-sonic signal is transmitted to operate the volume up relay 334 and energize the motor control winding 462. The potentiometer shaft 49 moves away from the lower end of its range towards its upper end, with the result that the cam 453 is displaced to permit the contacts 444 to be closed. The closure of the contacts 444 returns the energization of the motor control winding 468 to the control of the relay 336 and its associated contacts 440, and, as long as the potentiometer shaft 49 remains in the middle of its range, the relay 336 exclusively controls the energization of the motor control circuit 468.

If it is desired to tune the receiver to a higher channel when the volume control function is selected and the rocker assembly of the selector 338 is in its FIG. 10 operative position, the transmitter 324 is operated to cause the channel up resonator rod 370 to radiate a first ultra-sonic signal. This first ulta-sonic signal, as indicated above, causes the discriminator to supply a D.C. pulse to the conductor 327 and thus the grid of the control tube 379. With the control tube 379 rendered conductive, an energizing circuit is completed for the channel up relay 330, as follows: ground, control tube 379, conductor 383, relay winding 330a, and B-plus. The operation of the relay 330 effects the downward movement of its armature 400 into engagement with a bar 408 fixedly secured to the right end of the rocker 386. The downwardly moving armature 400 causes the rocker 386 to move from its FIG. 10 operative position into its other operative position (not shown). This movement of the rocker 386 causes the gear train 390 to be rendered ineffective by displacing its input gear 405 upwardly out of driving engagement with the axially movable pinion gear 339 and further causes the gear train 394 to be rendered effective by displacing its input gear 411 downwardly into a position to be drivingly engaged by the axially movable pinion gear 339 of the motor 340.

As described above, the channel up relay 330 in addition to actuating the rocker assembly 386 also effects the energization of the motor 340. In this connection, the armature 400 of the relay 330 closes a pair of contacts 456 to complete an energizing circuit for the motor control winding 462, as follows: ground, contacts 456, conductor 458, conductor 426, contacts 427 controlled by the friction cam 450, conductor 428, motor control winding 462, conductor 429, the A.C. source, and ground. Incident to the energization of the motor 340, the pinion gear 339 simultaneously rotates in a clockwise direction and moves axially into driving engagement with the input gear 411 of the gear train 394, whereby a driving connection is obtained between the motor 340 and the control shaft 396 throuhg the gear train 394. With the pinion gear 339 rotating in a clockwise direction, the control shaft 396 rotates in a counterclockwise direction and, since the main tuning shaft 45 is directly connected to the control shaft 396 by the mechanical connection 397, the main tuning shaft 45 may be considered as also rotating in a counterclockwise direction. In contrast to the incremental adjustment of the potentiometer shaft 49 in the audio circuit 48, the main tuning shaft 45 rotates under the control of a programming mechanism 494 to assure that the main tuning shaft 45 is moved into a next higher transmitting channel for the area in which the receiver 20 is located. The programming mechanism 494 is identical in construction and performance to the previously-described programming mechanism 194 and, briefly comprises a cam follower 497 for coacting with thirteen cam buttons 495 suitably supported from a wheel 496 mounted on the control shaft 396. The mechanism 494 is shown in its channel 2 position wherein the cam follower 497 engages the cam button 495–2 to maintain contacts 498 and 500 in an open position.

However, as the control shaft 396 rotates in a counter-clockwise direction as a result of the energization of the motor 340 by the third ultra-sonic signal, the programming mechanism 494 rotates in a counterclockwise direction, so that the cam button 495–2 moves counterclockwise out of engagement with the cam follower 497. The cam follower 497, being inherently resiliently biased toward the programming mechanism 494, moves into engagement with the flattened part of the button 495–3 thereby to close the contacts 498 and 500. The closure of the contacts 498 performs no useful function since the frictional cam 450 mounted on the motor shaft 340a opens the contacts 449 when the motor 340 rotates in a clockwise direction to prevent either the energizing circuit or the holding circuit for the motor control winding 468 from being completed. By this arrangement, the motor control winding 468 can never be simultaneously energized with the motor control winding 462 as a result of the operation of either the transmitter 324 or the programming mechanism 494. The closure of the contacts 500 completes a holding circuit for the motor control winding 468, as follows: ground, contacts 500, conductor 504, conductor 426, contacts 427, conductor 428, motor control winding 462, conductor 429, the A.C. source 430, and ground. This above-described holding circuit thus energizes the motor control winding 462 independently of the above-described energizing circuit controlled by the channel up relay 330 and its associated contacts 456. Some time after the holding circuit is completed, the transmission of the first ultra-sonic signal is ended with the result that the relay 330 is deenergized and its contacts 456 are opened. The opening of contacts 456 opens the energizing circuit for the motor control winding 468 but, since the holding circuit is completed under the control of the programming mechanism 494, the motor control winding 468 remains energized and the motor 340 continues to drive the main tuning shaft 45.

The main tuning shaft 45 in the receiver 20 is rotated under the control of the programming mechanism 494 until it moves into its adjacent higher channel position, for example, channel 5. Specifically, the counterclockwise movement of the control shaft 396 continues until the cam button 495-5 moves into engagement with the cam followed 497, whereby the cam follower 497 moves radially outward to open the contacts 498 and 500. The opening of the contacts 500 opens the holding circuit for the motor control winding 462 and the motor 340 is deenergized. The motor driving shaft 340a moves axially downwardly out of driving engagement with the gear train 394 to break the driving connection between the motor 340 and the main tuning shaft 45 so that the movement of the main tuning shaft 45 is arrested.

In the event that it is desired to tune the television receiver to channel 2 when the receiver is tuned to channel 5, the transmitter 324 is operated to cause the channel down resonator rod 372 to radiate a second ultra-sonic signal. This second ultra-sonic signal causes the discriminator to supply a D.C. pulse to the conductor 329 and the grid of the control tube 380, thereby rendering the control tube 380 conductive to complete an energizing circuit for the channel down relay 332, as follows: ground, control tube 380, conductor 384, relay winding 332a, and B-plus. The operation of the relay 332 causes its armature 402 to move downwardly but, since the rod 408 connected to the rocker 386 is already in its downward position, the armature 404 does not actuate the rocker 386. Of course, in the event that the rocker 386 is in the position shown in FIG. 10, the downwardly moving armature 402 engages the rod 408 to cause the rocker 386 to move from its FIG. 10 operative position into its other operative position (not shown). In any event, the downwardly moving armature 402 does close a pair of contacts 505 to complete an energizing circuit for the motor control winding 468 as follows: ground, contacts 505, conductor 506, conductor 508, conductor 448, contacts 449 controlled by the friction cam 450, conductor 452, motor control winding 468, conductor 429, the A.C. source 430, and ground. The energized control winding 468 causes the pinion gear 339 simultaneously to rotate in a counter-clockwise direction and to move axially into driving engagement with the input gear 411 of the gear train 394, thereby to establish a driving connection between the motor 340 and the main tuning shaft 45 through the gear train 394 and the control shaft 396. With the pinion gear 339 rotating in a counterclockwise direction, the control shaft 396 and the programming mechanism 494 rotate in a clockwise direction. The clockwise rotation of the programming mechanism 494 causes the button 495-5 to move out of engagement with the cam follower 497 so that the cam follower 497 moves into engagement with the flattened part of the button 495-4 and closes the contacts 498 and 500 while the second ultra-sonic signal is being transmitted. The closure of the contacts 500 performs no useful function since the frictional cam 450 mounted on the motor shaft 340a opens the contacts 427 when the motor shaft 340a rotates in a counterclockwise direction to prevent either the energizing circuit or the holding circuit for the motor control winding 462 from being completed. By this arrangement, the motor control winding 462 can never be simultaneously energized with the motor control winding 468 as a result of the operation of either the transmitter 324 or the programming mechanism 494. The closure of the contacts 498 completes a holding circuit for the motor control winding 468, as follows: ground, contacts 498, conductor 507, conductor 508, conductor 448, contacts 449 controlled by the friction cam 450, conductor 452, motor control winding 468, conductor 429, the A.C. source 430, and ground. After the completion of this holding circuit and while the cam follower 497 engages the flattened portion of the cam buttons 495-4 or 495-3, the transmission of the second ultra-sonic signal is ended, with the result that the channel down relay 332 is deenergized and its contacts 505 are opened. The opening of the contacts 505 opens the energizing circuit for the motor control winding 468, but, since the holding circuit remains closed under the control of the programming mechanism 494, the motor 340 remains energized. When the button 495-2 moves into engagement with the cam follower 497, the contacts 498 and 500 are closed and, thus, the holding circuit for the motor control winding 468 is opened. Accordingly, the motor 340 is deenergized and its pinion gear 339 is moved axially downward out of driving engagement with the gear train 394 to break the driving connection between the motor 340 and the main tuning shaft 45.

As stated in connection with the FIG. 2 embodiment, it should be understood that any two control functions of a television receiver can be remotely controlled by the FIG. 10 embodiment. In fact, more than two control functions can be controlled by increasing the number of gear trains and associated pairs of relays and by modifying the rocker assembly accordingly.

Considering now the FIG. 11, three-button continuous adjustment embodiment, it comprises a modified form of the FIG. 2, three-button incremental adjustment embodiment. It differs primarily from the FIG. 2 embodiment in that it provides for continuous adjustment of the sound level of the controlled television receiver, for example, instead of an incremental adjustment as described above. The FIG. 11 embodiment functions similarly to the FIG. 2 embodiment and, in this connection, the FIG. 1 diagrammatic illustration of the FIG. 2 embodiment is equally applicable to the FIG. 11 embodiment. Accordingly, one of the control functions is first selected for remote control operation and thereafter the operative condition of the selected control function is changed.

Although the control system 623 shown in FIG. 11 is not illustrated as controlling a television receiver, the control system 623 will be described as controlling the television receiver illustrated in FIG. 2, and, in this connection, the same reference numerals will be used to identify the controlled potentiometer shaft 49 in the audio circuit 48 of the receiver 20 and the reference numeral 45 will be used to identify the main tuning shaft in the receiving circuit 44. Briefly, the remote control system 623 embodies a transmitter 624 which includes a selector resonator rod 625, an up-rod 626, and a down-rod 627, respectively actuated to produce first, second, and third ultra-sonic signals. These signals are converted by a microphone 629 into electrical signals which are fed into a three-frequency selective amplifier network 628, identical to the network 28 described above. An amplifier in the network 628 amplifies the electrical signals and feeds them into a discriminator which causes D.C. pulses to be supplied to conductors 630, 631 and 632. These conductors are respectively associated with the grids of negatively biased, control tubes 633, 635, and 637 which, when rendered conductive by the pulses, complete energizing circuits for a selector relay 640, an up relay 642 and a down relay 644. The relay 640, similar to the volume selector relay 30 described above, operates a selector 645 comprising a rocker assembly 646 and gearing mechanism 648, which are identical in every respect to the above described rocker assembly 85 and the gearing mechanism 88 embodied in the FIG. 2 embodiment. Successive operation of the selector relay 640 by successively radiated, first ultra-sonic signals alternately operates the rocker assembly 646 to alternately render effective gear trains 650 and 652 in the gearing mechanism 648 to be driven by a motor 654 subsequently energized under the control of either of the up relay 642 or the down relay 644. The gear trains 650 and 652 respectively provide a driving connection between the motor 654 and control shafts 656 and 658 which are respectively mechanically connected to the potentiometer shaft 49 and the main tuning shaft 45 by mechanical connections indicated by dotted lines and identified as 657 and 689.

Assuming that the volume control function is selected, i.e., the gear train 650 is rendered effective by the rocker assembly 646, the sound level of the receiver 20 is increased or decreased by operating the transmitter 624 to radiate a second or a third ultra-sonic signal. The second or third ultra-sonic signal causes either the up relay 642 or the down relay 644 to operate thereby to energize the motor 654 and drive the potentiometer shaft 49 toward either the upper end or the lower end of its range. In contrast to the above-described FIG. 2 embodiment, the potentiometer shaft 49 does not stop at the end of the second or third ultra-sonic signal but continues to move and increase the sound level of the receiver 20 under the control of the control system 623. When the desired sound level is obtained, the same ultra-sonic signal is transmitted to again operate either the up relay 642 or the down relay 644 whereby the motor 654 is deenergized and the movement of the potentiometer shaft 49 is arrested.

Considering now the operation of the FIG. 11 embodiment in greater detail, let it be assumed that the volume control function is selected by the selector relay 640 and the gear train 650 is rendered effective to be drivingly engaged by the pinion gear 655 of the motor 654. If it is desired to increase the sound level of the receiver 20, the transmitter 624 is operated to cause the up resonator rod 626 to radiate a second ultra-sonic signal. This second ultra-sonic signal, as described above, renders the control tube 635 conductive to complete an energizing circuit for the relay 642, as follows: ground, the control tube 635, the conductor 660, the relay winding 642a, and B-plus. The energization of the relay 642 causes its armature 662 to step a stepping mechanism 664 and to close contacts 666 and contacts 668. The closure of the contacts 668 performs no useful function at this time since contacts 671 located in its circuit are opened under the control of the rocker assembly 646. The closure of the contacts 666 completes an energizing circuit for the motor control winding 670, as follows: ground, contacts 666, conductor 674, contacts 676 controlled by a cam 677 mounted on a rocker 647, conductor 678, contacts 680 controlled by a position limit cam 708 mounted on the control shaft 656, conductor 682, conductor 684, contacts 686 controlled by a friction cam 762 mounted on the motor shaft 654a, conductor 688, the control winding 670, conductor 690, an A.C. source 692, and ground. The energization of the control winding 670 causes the pinion gear 655 simultaneously to rotate in a clockwise direction and to move axially into engagement with the gear train 650, whereby a driving connection between the motor 654 and the potentiometer shaft 49 is obtained and movement of the shaft 49 is initiated. As described above, with the clockwise rotating pinion gear 655, the potentiometer shaft moves toward the upper end of its range so that the sound level of the receiver 20 is gradually increased under the control of the motor 654.

Returning to the operation of the stepper mechanism 664, it is rendered operative incident to energization of the relay 642. The stepping mechanism 664 includes an armature pawl 662a mounted on the armature 662 and adapted to step a ratchet wheel 694 which is mechanically connected to a twelve position cam 696 embodying six cam buttons 698 spaced apart by non-camming surfaces 699 and engageable with a cam follower 700. The stepping mechanism 664 has twelve operative positions so that in response to successive operation of the relay 642 the cam follower 700 moves radially inwardly and outwardly to alternately open and close a pair of contacts 702. Specifically, when the stepper mechanism 664 is ineffective prior to the transmission of the second ultra-sonic signal and operation of the relay 642, the cam follower 700, being inherently resilient, engages a non-camming surface 699, thereby to open the contacts 702. However, as the result of the operation of the relay 642 and the stepping of the mechanism 664, the cam 696 is stepped into a position wherein one of the cam buttons 698 engages the cam follower 700 to close the contacts 702. The closure of the contacts 702 completes a shunting circuit across the contacts 666, as follows: ground, conductor 704, contacts 702, and conductor 706. Accordingly, the motor control winding 670 is energized independently of the contacts 666 by the following circuit: ground, conductor 704, contacts 702, conductor 706, conductor 674, contacts 676, conductor 678, contacts 680, conductor 682, conductor 684, contacts 686, conductor 688, motor control winding 670, conductor 690, the A.C. source 692, and ground. Even though the contacts 666 are opened at the end of the transmission of the second ultra-sonic signal, the motor control winding 670 remains energized under the control of the stepping mechanism 664. In fact, the motor 670 remains energized until either the stepping mechanism 664 is stepped by the relay 642 or until the potentiometer shaft 49 reaches the upper end of its range whereupon the position limit cam 708 opens the contacts 680 to open the energizing circuit for the motor control winding 670. In any event, with the motor control winding 670 energized, the potentiometer shaft 49 moves toward the upper end of its range, thereby effecting a continuous increase in the sound level of the receiver 20. When the sound level reaches a desired value, the potentiometer shaft 49 is arrested by the transmission of another second ultra-sonic signal. This signal, as described above, renders the control tube 635 conductive thereby to operate the relay 642 and its associated armature 662. The actuated armature 662 steps the stepping mechanism 664 and closes the contacts 666 and 668. The closure of the contacts 668 performs no useful function as suggested above, while the closure of the contacts 666 completes the above-described energizing circuit for the motor control winding 670 and, in fact, maintains the motor control winding 670 energized during the transmission of the second ultra-sonic signal. The stepping of the mechanism 664 causes the cam button 698 to move one operative position, with the result that the cam follower 700 engages the non-camming portion 699 and opens the contact 702. The opening of the contacts 702 opens the shunt circuit across the contacts 666 and thereby returns the energization of the control winding 670 to the control of the relay 642 and its associated contacts 666. At the end of the transmission of the second ultra-sonic signal, the relay 642 is deenergized and its contacts 666 are opened, whereby the energizing circuit for the motor control winding 670 is opened. The pinion gear 655 moves axially downwardly out of driving engagement with the gear train 650, thereby breaking the driving connection between the motor 654 and the potentiometer shaft 49 so that the movement of the potentiometer shaft 49 is arrested. Although there is a slight time lag between the transmission of the second ultra-sonic signal and the stopping of the potentiometer shaft 49, this time lag is insignificant and the sound level obtained is substantially identical to the sound level of the receiver at the time the second ultra-sonic signal is transmitted.

On the other hand, if it is desired to lower the sound level of the receiver 20, the transmitter 624 is operated to cause the down resonator rod 627 to radiate a third ultra-sonic signal. As described hereinabove, this third ultra-sonic signal renders the control tube 637 conductive thereby to complete an energizing circuit for the down relay 644, as follows: ground, the control tube 637, conductor 709, the relay winding 644a, and B-plus. The operation of the relay 644 causes its armature 710 to actuate a stepper mechanism 714 and to close contacts 716 and 718. The closure of the contacts 718 performs no useful function at this time since contacts 720 located in its circuit are opened under the control of the rocker 647. The closure of the contacts 716 completes an energizing circuit for the motor control winding 672, as follows: ground, contacts 716, conductor 722, contacts 728 controlled by a position limit cam 746 mounted on the control shaft 656, conductor 726, contacts 724 controlled by the cam 677 mounted on the rocker 647, conductor 730, conductor 732, contacts 734 controlled by the friction cam 762, conductor 736, motor control winding 672, conductor 690, the A.C. source 692, and ground. The energization of the motor control winding 672 causes the pinion gear 655 simultaneously to rotate in a counterclockwise direction and to axially move into driving engagement with the gear train 650, thereby to complete a driving connection between the motor 654 and the potentiometer shaft 49. With the pinion gear 655 rotating in a counterclockwise direction, the potentiometer shaft 49 rotates towards the lower end of its range so that the sound level of the receiver 20 begins to gradually decrease.

The stepping mechanism 714 actuated by the relay 644 causes the motor 654 to be operated under its control instead of the control of the relay 644 and its associated contacts 716 and, to this end, completes a shunt circuit across the contacts 716. Specifically, the stepping mechanism 714 is identical in construction to the above-described stepping mechanism 664 and includes an armature pawl 710a mounted on the armature 710 and adapted to engage a ratchet 734 which is mechanically connected to a twelve-position cam 735 embodying six cam buttons 736 spaced apart by non-camming surfaces 737 and engageable with a cam follower 738. When the stepper mechanism 714 is ineffective, the cam follower 738 engages one of the non-camming surfaces to open a pair of contacts 740. However, as a result of the stepping of the ratchet wheel 734, one of the cam buttons 736 engages and moves the cam follower 738 into the position shown in FIG. 11 so as to close the contacts 740 and complete a shunt circuit across the contacts 716, as follows: ground, the contacts 740, and a conductor 744. Thus, the energizing circuit for the motor control winding 672 is provided through the contacts 740. Consequently, the motor 654 remains energized independently of the down relay 644 and its associated contacts 716. At the end of the transmission of the third ultra-sonic signal, the down relay 644 is deenergized with the result that the contacts 716 and 718 are opened. The opening of the contacts 716 performs no useful function since the energizing circuit for the motor control winding 672 is completed through the shunt circuit including the contacts 740. It will be appreciated that the motor 654 continues to rotate until the energizing circuit for the motor control winding 670 is opened either by the contacts 728 under control of the position limit cam 746 on the control shaft 656 or by the contacts 740 under the control of the stepper mechanism 714.

When the sound level of the receiver is reduced to a desired value, the transmitter 624 is operated to cause the down resonator rod 627 to radiate another third ultrasonic signal. This ultra-sonic signal, as described above, operates the relay 644 with the result that its armature 710 steps the stepping mechanism 714 and closes the contacts 716 and 718. The closure of the contacts 716 completes the above-described energizing circuit for the motor control winding 672 so that the motor 654 remains energized during the duration of the third ultra-sonic signal. The stepping of the stepper mechanism 714 effects the opening of the contacts 740 and the opening of the shunt circuit for the contacts 716. Hence, the operation of the motor winding 672 is returned to the control of the down relay 644 and its associated contacts 716. At the end of the transmision of the third ultra-sonic signal, the down relay 644 is deenergized thereby to open the contacts 716 and open the energizing circuit for the motor control winding 672. The deenergized motor control winding 672 alows the pinion gear 655 to move downwardly out of driving engagement with the gear train 650, whereby the driving connection between the motor 654 and the potentiometer shaft 49 is broken and the movement of the potentiometer 49 is arrested.

It will be appreciated that similar to the FIG. 2 embodiment, the potentiometer shaft 49 is prevented from moving beyond the upper and lower ends of its range. In this connection, the cams 708 and 746 are so located on the control shaft 656 that the contacts 680 and 728, respectively, are opened incident to movement of the potentiometer shaft 49 into the upper and lower ends of its range. The operation of the position limit cams 708 and 746 and their associated contacts 680 and 728 is identical to the operation of the position limit cams 190 and 192 and associated contacts 154 and 176 described above in connection with the FIG. 2 embodiment.

The television receiver 20 is tuned to a different channel by operating the transmitter 624 to cause the selector resonator rod 625 to radiate a first ultra-sonic signal. As described above, this first ultra-sonic signal causes a D.C. pulse to be supplied to the conductor 630 to render the control tube 633 conductive to complete an energizing circuit for the relay 640, as follows: ground, the control tube 633, the conductor 646, relay winding 640a, and B-plus. The operation of the relay 640 causes its armature 641 to lower a rotatably mounted arm 643 having an angulated finger 643a adapted to coact with the rocker 647. Similar to that of the rocker assembly 85 in the above-described FIG. 2 embodiment, the downward movement of the finger 643a moves the rocker 647 from a position illustrated in FIG. 11 to its other operative position (not shown). The movement of the rocker assembly 646 renders the gear train 650 ineffective and renders the gear train 652 effective to be drivingly engaged by the pinion gear 655 axially movable by the motor 654 under the control of either the up relay 642 or the down relay 644. As in the FIG. 2 embodiment, the rocker 647 is identical in construction with the rocker 86 and is mechanically connected to the gear trains 650 and 652 by spindle and disc arrangements 651 and 653, respectively, the arrangements 651 and 653 being identical in construction and operation to the spindles 118—120 and discs 114—116. Thus movement of the rocker 647 causes the cam 677 mounted thereon to open the contacts 676 and 724 and close contacts 671 and 720. The opening of the contacts 676 and 724 opens the above described energizing circuits for the motor control windings 670 and 672 while the closure of the contacts 671 and 720 prepares energizing circuits for the motor control windings 670 and 672, respectively. Even though the contacts 671 and 720 are closed, the motor 654 is not energized since the contacts 668 and 718 are respectively opened under the control of the up relay 642 and the down relay 644.

By employing separate energizing circuits which are alternately rendered effective by the rocker cam 677, it will be appreciated that even if the channel control function is selected while the sound level of the receiver is being changed, the main tuning shaft 45 is driven by the motor 654 under the control of a programming mechanism 757 secured to the control shaft 658, instead of under the control of the stepper mechanism 664 or 714 through the above-described shunt circuits. Accordingly, without the separate energizing circuits for the control windings 670 and 672, the stepper mechanisms 664 and 714 would maintain the shunt circuits closed to continuously energize either of the windings 670 or 672 independent of the programming mechanism 757 and even though the mechanism 757 opens the associated holding circuits for the windings 670 and 672, the main tuning shaft 45 would continue to rotate.

Furthermore, the separate energizing circuits for the windings 670 and 672 permit the channel of the receiver 20 to be changed when the potentiometer shaft 49 is at either the upper or lower end of its range. In fact, the cam 677 and its associated contacts 676, 724 and 671 and 720 perform the identical function as the camming arrangement 206 described in connection with FIG. 2.

Assuming that the receiver is tuned to channel 5, for example, and it is desired to tune the receiver to an adjacent higher channel, for example channel 7, a second ultra-sonic signal is radiated from the transmitter 624 to operate the selector relay 642. The operation of the selector relay 642 causes its armature 662 to step the stepping mechanism 664 and to close the contacts 666 and 668. Although the stepping of the stepping mechanism 664 closes the contacts 702 while the contacts 666 are closed, no useful function is performed since the energizing circuit for the motor control winding 670 is opened by the contacts 676 under the control of the rocker cam 677. The closure of the contacts 668, however, completes a second energizing circuit for the motor control winding 670 as follows: ground, contacts 668, conductor 754, contacts 671, conductor 756, conductor 774, conductor 684, contacts 686, conductor 688, motor control winding 670, conductor 690, the A.C. source 692, and ground. The energization of the motor control winding 670 causes the pinion gear 655 simultaneously to rotate in a clockwise direction and to axially move into driving engagement with the gear train 652 to complete a driving connection between the main tuning shaft 45 and the motor 654 through the gear train 652 and the control shaft 658. The rotation of the control shaft 658 causes the operation of the programming mechanism 757 which is identical in construction and operation to the above-described programming mechanism 194 in the FIG. 2 embodiment. The programming mechanism 757 causes its associated contacts 758 and 760 to close. The closure of the contacts 760 performs no useful function at this time since the contacts 734 are opened by the friction cam 762 mounted on the output driving shaft 654a. The closure of the contacts 758, however, completes a holding circuit for the motor control winding 670, as follows: ground, contacts 758, conductor 764, conductor 774, conductor 684, contacts 686, conductor 688, control winding 670, conductor 690, the A.C. source 692, and ground. As described above, at the end of the transmission of the second ultra-sonic signal, the second energizing circuit for the motor control winding 670 is opened but since the motor control winding 670 remains energized through the holding circuit under the control of the programming mechanism 757 the motor 654 remains operative. When the programming mechanism 757 reaches its channel 7 position, the cam follower 759 opens the contacts 758 and 760, thereby to open the holding circuit for the motor control winding 670 and deenergize the motor 654. The deenergization of the motor 654 causes the pinion gear 655 to move axially out of driving engagement with the gear train 652, whereby the driving connection between the motor 654 and the main tuning shaft 45 is broken and the main tuning shaft is arrested in its channel 7 position.

In the event that it is then desired to retune the receiver to channel 5, a third ultra-sonic signal is radiated from the transmitter 624. This ultra-sonic signal operates the relay 644 which causes the stepping mechanism 714 to be stepped and the contacts 716 and 718 to be closed. The stepping of the stepping mechanism 714 to close the contacts 740 and the closure of the contacts 716 perform no useful function since the energizing circuit for the motor control winding 672 is opened by the contacts 724 under the control of the rocker cam 677. However, the closure of the contacts 718 completes a second energizing circuit for the motor control winding 762, as follows: ground, contacts 718, conductor 755, contacts 720, conductor 760, conductor 775, conductor 732, contacts 734, conductor 736, motor control winding 672, the conductor 690, the A.C. source 692, and ground. Before the end of the transmission of the third ultra-sonic signal, the programming mechanism 757 completes a holding circuit for the motor control winding 672, as follows: ground, contacts 760, conductor 765, conductor 775, conductor 732, contacts 734, conductor 736, motor control winding 672, conductor 690, A.C. source 692, and ground. As described before, when the main tuning shaft 45 reaches its channel 5 position, the holding circuit for the motor control winding 672 is opened and the main tuning shaft 45 is arrested.

From the foregoing description, it will be appreciated that when the selector relay 640 is operated during the movement of the potentiometer shaft 49 by the motor 654 under the control of either of the stepping mechanisms 664 or 714, the movement of the rocker 647 into its operative position (not shown) opens the contacts 676 and 724 to open the energizing circuits for the windings 670 and 672 but does not affect in any way the stepper mechanisms 664 or 714. In fact, the stepper mechanism 664 or 714 maintains the shunt circuits for the contacts 666 and 716 closed as long as another second or third ultrasonic signal is not transmitted.

It will be further appreciated that every time the receiver is tuned to a different channel, the up relay 642 or the down relay 644 is operated to step the stepper mechanisms 664 or 714. The successive stepping of the stepping mechanisms 664 and 714 alternately opens the contacts 702 and 740, respectively. Hence, if the channel selection control function is selected by operation of the relay 640 the condition of the stepper mechanisms 664 and 714 remains unchanged. However, incident to changing of the channel, the up relay 642 or the down relay 644 is operated to change the condition of its associated stepper mechanism 664 or 714. Thus, when the volume control function is again selected as a result of the operation of the selector relay 640 after the receiver 20 is changed to another channel, the condition of the stepper mechanisms 664 and 714 may or may not be changed.

For example, if the sound level of the receiver 20 is being increased when the channel selection function is selected and then receiver 20 is tuned to a higher channel, the up relay 642 is accordingly operated to return the stepper mechanism 664 to its inoperative condition. Hence, when the volume control function is again selected, the stepper mechanism 664 is in its ineffective condition so that the potentiometer shaft 49 does not move. However, if the receiver 20 is tuned to a second higher station, the relay 642 is operated twice so that the stepper mechanism 664 returns to its operative condition to complete the shunt circuit across the contacts 666. Accordingly, when the volume control function is again selected, the potentiometer shaft 49 again rotates toward the upper end of its range by the motor 654 under the control of the stepper mechanism 664. On the other hand, if the channel selection function is selected while the sound level of the receiver 20 is being increased and, further, if the receiver 20 is tuned to a lower channel, the operation of the down relay 644 causes its associated stepper mechanism 714 to be rendered effective to close its contact 740 and to complete the shunt circuit across contact 716. Although none of the circuits through the motor control windings 670 or 672 are completed under the control of the stepper mechanisms 664 and 714—since the contacts 676 and 724 controlled by the rocker cam 677 are opened—incident to selection of the volume control function and the attendant movement of the rocker 647 into the position shown in FIG. 11, the motor control windings 670 and 672, in the absence of the below-described interlock devices, would be simultaneously energized as a result of the closure of contacts 676 and 724 by the rocker cam 677. Actually, the contacts 676 and 724 controlled by the rocker cam 677 do not close simultaneously so that one or the other of the motor control windings 670 or 672 is first energized. Thereafter, the friction cam 762 prevents the simultaneous energization of the other motor control windings but, if no additional signals are transmitted, the potentiometer shaft 49 moves from one end of its range to the other under the joint control of the friction cam 762 and the position limit cams 708 and 746. It will be readily appreciated, in the absence of mechanical interlock devices, that a complicated and confusing operation of the control system 623 results and the operator of the transmitter 624 is unable to properly control the television receiver 20.

For the purpose of inter-relating the operation of the stepping mechanisms 664 and 714 to prevent both of the shunt circuits across the contacts 666 and 716 from being completed at the same time, a pair of mechanical interlock devices 770 and 772 are provided. Specifically, the interlock device 770 prevents the stepper mechanism 714 from operating when the cam follower 700 of the stepper mechanism 664 engages one of its associated camming buttons 698 and the interlock device 772 prevents the camming mechanism 664 from operating when the cam follower 738 of the stepper mechanism 714 engages one of its associated contact buttons 736. By this arrangement, the motor 654 can be operated under the control of only one or the other of the stepper mechanisms 664 and 714, but never is operated under the control of both.

Considering now the interlocking device 770 in greater detail, it comprises a mechanical connection indicated by dotted lines 770 interconnected between the cam follower 700 of the mechanism 664 and the armature pawl 710a associated with the mechanism 714 and mounted on the armature 710 of the down relay 644. The mechanical connection is movable under the control of the cam follower 700 between a position illustrated in solid lines and a position illustrated in dotted lines in FIG. 11. When the stepper mechanism 664 is ineffective, i.e., when the shunt circuit across the contacts 666 is opened, the cam follower 700 engages the non-camming portion 699 to position the armature pawl 710a in its solid line position shown in FIG. 11. In this position, the operation of the down relay 644 incident to the transmission of a third ultra-sonic signal steps the stepper mechanism 714; specifically, the armature pawl 710a is able to engage the ratchet wheel 734 to step the twelve position cam 735 into an adjacent operative position. However, when the stepper mechanism 664 is effective, i.e., when the shunt circuit across the contacts 666 is closed, the cam follower 700 engages one of the cam buttons 698 to position the armature pawl 710a in its dotted line position shown in FIG. 11. In this position, the operation of the down relay 644 in response to a third ultra-sonic signal does not step the mechanism 714. Accordingly, even though a third ultra-sonic signal is transmitted to tune the receiver 20 to a lower channel when the stepper mechanism 664 is effective, as a result of a previously transmitted second ultra-sonic signal, and further when the rocker assembly 646 is in its operative position (not shown) as a result of a previously transmitted first ultra-sonic signal, the operation of the down relay 644 does not step the mechanism 714 and the shunt circuit for the contacts 716 is not closed. However, as a result of the operation of the relay 644, the contacts 716 and 718 close and the second energizing circuit for the motor control winding is completed to move the main tuning shaft 45 to its lower channel position as described hereinbefore. Moreover, when the volume control function is selected agin, both of the stepper mechanisms will not be rendered effective and the energizing circuits for both of the control windings 670 and 672 will not be simultaneously energized. In fact, if the up relay 642 has not been operated, the potentiometer shaft 49 continues to move toward the upper end of its range to increase the sound level of the receiver 20. With the sound level increasing, it is only necessary to transmit another second ultra-sonic signal to operate the relay 642 and stop the volume potentiometer shaft to obtain a desired sound level. It will be apparent that the same result is obtained with respect to the up relay 642 when the stepper mechanism 714 is effective or ineffective.

In order to identify the selective control function, an identification means 766, identical to the previously described identification means 130 of the FIG. 2 embodiment, is employed and is mechanically related to the rocker assembly 646. The indicating means comprises a generally translucent plate 768 seated over a recessed portion in the receiver 20, the plate 768 being divided into separate windows 768a and 768b, respectively, which are marked "channel selection" and "volume control." The windows 768a and 768b are alternately illuminated by lamps 771a and 771b controlled by a position-sensitive switch 773 actuable by the rocker 647. The switch 773 embodies contacts 773a and 773b for completing energizing circuits for the bulbs 771a and 771b respectively, incident to movement of the rocker 647.

Considering now the FIG. 12 four-button, continuous adjustment embodiment, it comprises a modified form of the above-described FIG. 10 embodiment. The FIG. 12 continuous adjustment embodiment differs from the FIG. 10 incremental adjustment embodiment, in that the sound level of the receiver 20, for example, is adapted to be continuously changed instead of being incrementally changed. The FIG. 12 continuous adjustment embodiment is similar in operation to the FIG. 11 embodiment in the sense that each provides for continuous adjustment of the sound level of the receiver 20 in the same general manner as described above. Specifically, the FIG. 12 embodiment changes the sound level of the receiver 20, similar to the FIG. 11 embodiment, by successively transmitting two of the same type of ultra-sonic signals. The FIG. 12 embodiment is functionally identical to the FIG. 10 embodiment and the FIG. 9 diagrammatic illustration of the functional operation of the FIG. 10 embodiment is equally applicable to the FIG. 12 embodiment.

Referring now to FIGS. 9 and 12, the control system 822 illustrated therein is adapted to control a television receiver 20, of the type illustrated in block form in FIG. 2, and to facilitate the description of the control system 822, the volume potentiometer shaft and the main tuning shaft controlled by the system 822 will be identified by the reference numerals 49 and 45, respectively.

Briefly, the control system 822 includes a transmitter 824 for transmitting ultra-sonic signals to a control system 823 located in the television receiver 20. The transmitter 824 includes four resonator rods, identified respectively as channel up rod 825, channel down rod 826, volume up rod 827, and volume down rod 828 which, respectively, radiate first, second, third and fourth ultra-sonic signals. These ultra-sonic signals are connected by a microphone 829 into electrical signals which are fed into an amplifier of a four-frequency selector amplifier network 831, identical to the above described network 328. The amplifier is coupled to a discriminator which, in response to the distinguishable electric signals, applies D.C. pulses to conductors 833, 834, 835, and 836, respectively, connected to the grids of negatively-biased, control tubes 837, 838, 839 and 840. As described above in connection with the FIG. 10 embodiment, the control tubes 837, 838, 839 and 840 are normally non-conductive and are rendered conductive by the D.C. pulses to complete energization circuits for a channel up relay 842, a channel down relay 844, a volume up relay 846, and a volume down relay 848. Similar to the FIG. 10 embodiment, the operation of the channel up relay 842 and channel down relay 844 actuates a rocker assembly 850 including a rocker 852 to render effective a gear train 854 of a gearing mechanism 856 and simultaneously energizes a motor 858 to move a pinion gear 860 mounted on its output driving shaft 858a into driving engagement with the gear train 854, the gear train 854 being identical in construction and operation to the gear train 94 in the above described FIG. 2 embodiment and the rocker assembly 850 being identical in construction and operation to the previously described rocker assembly of selector 338 in the FIG. 10 embodiment. As a result, a driving connection is obtained between the motor 858 and the main tuning shaft 45 through the gear train 854 and a control shaft 862.

On the other hand, the operation of the volume up relay 846 or the volume down relay 848 actuates the rocker assembly 850 to render effective a gear train 864 of the gearing mechanism 856 and simultaneously energizes the motor 858 to cause the pinion gear 860 to axially move into driving engagement with the gear train 864, the gear train 864 being identical in construction and operation to the gear train 90 in the above described FIG. 2 embodiment. Thus, a driving connection is completed between the motor 858 and the potentiometer shaft 49 through the gear train 864 and a control shaft 866.

Inasmuch as the FIG. 12 embodiment is a modified form of the FIG. 10 embodiment, the transmission of only one of the four ultra-sonic signals is needed to initiate the adjustment of either the volume potentiometer shaft 49 or the main tuning shaft 45, in contrast with the FIG. 2 and the FIG. 11 embodiments wherein one ultrasonic signal is transmitted to select a control function and thereafter another ultra-sonic signal is used to effect the adjustment of the selected control function. More specifically, the FIG. 12 embodiment differs from the FIG. 11 embodiment in that in the FIG. 12 embodiment the successive transmission of the two of the same ultrasonic signals achieves a desired change in the sound level of the receiver, for example, while in the FIG. 11 embodiment, a transmission of one ultra-sonic signal is required to select the volume control function, for example, and thereafter a successive transmission of two other ultra-sonic signals is required to change the operative condition of the volume control function.

If it is desired to increase the sound level of the television receiver 20, the transmitter 824 is operated to cause the volume up resonator rod 827 to radiate a third ultra-sonic signal. As described above, this third ultrasonic signal causes the discriminator to supply a D.C. pulse to the conductor 835, with the result that the control tube 839 is rendered conductive to complete an energizing circuit for the volume up relay 846, as follows: ground, control tube 839, the conductor 868, relay winding 846a, and B-plus. The operation of the relay 846 causes its armature 870 to move downwardly to effect the following operation: step a stepping mechanism 872, close a pair of contacts 874, and engage and move downwardly a rod 876 fixedly secured to the left end of the rocker 852, assuming of course that the rocker 852 is in its operative position (not shown). This movement of the rocker 852 causes the spindle and disc arrangement 865 to render the gear train 854 ineffective and the gear train 864 effective. Of course, if the rocker 852 is in its FIG. 12 operative position, as indicated above, it is not moved by the armature 870. In any event, simultaneously with the gear train 864 being rendered effective, the motor 858 is energized as a result of the closure of the contacts 874 by the relay armature 870. The closure of the contacts 874 completes an energizing circuit for the motor control winding 778, as follows: ground, contacts 874, conductor 882, contacts 883, conductor 885, contacts 884 controlled by a position limit cam 950 mounted on the control shaft 866, conductor 886, conductor 892, contacts 894 controlled by a friction cam mounted on the motor shaft 858a, conductor 896, motor control winding 778, conductor 898, an A.C. source 899, and ground. Incident to energization of the motor 858, the pinion gear 860 simultaneously rotates in a clockwise direction and axially moves into driving engagement with the gear train 864 to provide a driving connection between the motor 858 and the potentiometer shaft 49. Thus, the potentiometer shaft 49 begins to move towards the upper end of its range under the control of the motor 858.

Returning to the operation of the relay 846, a pawl 870a on the relay armature 870 steps the stepper mechanism 872 which comprises a ratchet wheel 900 mechanically connected to a twelve-position cam 901 including six contact buttons 902 spaced apart by non-camming cylindrical surfaces 904, which buttons 902 and surfaces 904 coact with a cam follower 906. The stepping of the mechanism 872 completes a shunt circuit across the contacts 874, so that the motor control winding 778 is energized independently of the relay 846 and its associated contacts 874. Specifically, incident to movement of the stepper 872, the cam follower 906 moves out of engagement with a non-camming portion 904 and engages one of the cam buttons 902, thereby closing contacts 908 to complete a shunt circuit across the contacts 874, as follows: ground, contacts 908, conductor 910, and conductor 912. At the end of the transmission of the third ultra-sonic signal, the relay 846 is deenergized and the contacts 874 are opened. However, because of the above-described shunt circuit, the motor control winding 778 is energized by the energizing circuit and shunt circuit, as follows: ground, contacts 908, conductor 910, conductor 912, conductor 882, contacts 883, conductor 885, contacts 884, conductor 886, conductor 892, contacts 894, conductor 896, motor control windings 778, conductor 898, the A.C. source 899, and ground. Accordingly, the motor 858 remains energized and the potentiometer shaft 49 continues to rotate toward the upper end of its range under the control of the stepping mechanism 872.

When the desired sound level is reached, another third ultra-sonic signal is transmitted from the transmitter 824 to operate the volume up relay 846. The operation of this relay 846, as indicated above, causes its armature 870 to step the stepping mechanism 872, and close the contacts 874. Since the rocker assembly 850 is in the position illustrated in FIG. 12, the armature 870 does not move the rod 876 downwardly and hence does not move the rocker assembly 850. The closure of the contacts 874 completes the above-described energizing circuit for the motor control winding 778 and causes the motor 858 to operate during the duration of the third ultra-sonic signal under the control of the relay 846. The contacts 874 solely control the operation of the motor 858 since the stepping of the stepping mechanism 872 opens the shunt circuit for the contacts 874. Specifically, the cam follower 906 moves out of engagement with the above cam button 902 into engagement with a non-camming portion 904, whereby the contacts 908 and their associated shunt circuits are opened. Hence, the motor 858 continues to drive the potentiometer shaft 49 under the control of the energized relay 846 and its contacts 874. Of course, at the end of the transmission of the third ultra-sonic signal, the relay 846 is deenergized and its contacts 874 are opened thereby to open the above-described energizing circuit for the motor control winding 778. Hence, the pinion gear 860 moves axially downward out of driving engagement with the gear train 864 to break the driving connection between the motor 858 and the gear train 864, with the result that the movement of the potentiometer shaft 49 is arrested.

On the other hand, if it is desired to lower the sound level of the receiver, the transmitter 824 is operated to cause the volume down resonator rod 828 to radiate a fourth ultra-sonic signal. This signal causes the discriminator to apply a D.C. pulse to the conductor 836, thereby to render the control tube 840 conductive and complete an energizing circuti for the volume down relay 848, as follows: ground, control tube 840, conductor 914, relay winding 848a, and B-plus. The operation of the relay 848 causes its armature 916 to move downwardly to step a stepper mechinasm 918 and close a pair of contacts 920. Inasmuch as the rod 876 is in its position illustrated in FIG. 12, the armature 916 does not move the rod 876 downwardly, and, thus, does not move the rocker assembly 850. The closure of the contacts 920 completes an energizing circuit for the motor control winding 780, as follows: ground, contacts 920, conductor 922, contacts 923, conductor 925, contacts 924, controlled by a position limit cam 952 mounted on the control shaft 866, conductor 926, conductor 932, contacts 934, controlled by the friction cam 895 mounted on the motor shaft 858a, conductor 936, motor control winding 780, conductor 898, the A.C. source 899, and ground. The stepper mechanism 918 functions to complete a shunt circuit across the contacts 920 to render the motor 858 operative under the control of the stepper mechanism 918 instead of the relay 848 and its associated contacts 920. Particularly, incident to actuation of the stepper mechanism 918, a cam follower 938 moves from a non-camming surface 940 into engagement with one of six cam buttons 942, thereby to close a pair of contacts 944, as follows: ground, conductor 946, contacts 944, and conductor 948. Thus the motor control winding 780 is energized under the control of the stepper mechanism 918, independently of the relay 848 and its associated contacts 920. At the end of the transmission of the fourth ultra-sonic signal, the relay 848 is deenergized and its contacts 920 are opened. The opening of the contacts 920 does not cause the motor control winding 780 to be deenergized since the winding 780 is energized through the shunt circuit across the contacts 944 and the potentiometer shaft 49 continues to rotate toward the lower end of its range to continuously decrease the sound level of the receiver 20.

After a desired sound level is obtained, another fourth ultra-sonic signal is radiated from the transmitter 824 to operate the relay 848 and its associated armature 916. The armature 916 causes the stepper mechanism 918 to be stepped and the contacts 920 to be closed. The closure of the contacts completes the above-described energizing circuit for the control winding 780 and causes the motor 858 to operate during the transmission of the fourth ultra-sonic signal under the control of the relay 848 and its associated contacts 920. The contacts 920 solely control the operation of the motor 858, since the stepper mechanism 918 opens the shunt circuit across the contacts 920. Specifically, the cam button 942 moves out of engagement with the cam follower 938 into engagement with non-camming portion 940 so that the contacts 944 are opened to open the above-described shunt circuit. At the end of the transmission of the fourth ultrasonic signal, the relay 848 is deenergized and its contacts 920 are opened thereby to open the energizing circuit for the motor control winding 780. The deenergization of the motor control winding 780 allows the pinion gear 860 to move axially out of driving engagement with the gear train 864, thereby to break the driving connection between the gear train 864 and the motor 858. Consequently, the movement of the potentiometer shaft 49 is arrested in its desired sound level position.

Similar to the above described FIG. 2, FIG. 10 and FIG. 11 embodiments, the potentiometer shaft 49 is prevented from moving beyond the upper and lower ends of its range. To this end, cams 950 and 952 are suitably positioned on the control shaft 866 to open the associated contacts 884 and 924 incident to the potentiometer shaft 49 moving into its upper and lower ends of its range, respectively.

It will be appreciated that when the sound level of the receiver is being changed, i.e., when the potentiometer shaft 49 is in the process of being rotated, it is possible to transmit a first or a second ultra-sonic signal for the purpose of tuning the receiver 20 to another station. In order to permit the motor 858 to be controlled by the channel up relay 842 or the channel down relay 844 and, thus, the programming mechanism 955 instead of the stepper mechanism 872 or 918, a cam 954 is suitably secured to the left end of the rocker 852 for the purpose of opening the above-described energizing circuits for the motor control windings 778 and 780. Thus, even though either of the stepper mechanisms 872 or 918 maintains the shunt circuit across the opened contacts 874 and 920 closed to continuously energize the winding 778 or 780, the cam 954 opens the contacts 883 and 923 to open-circuit the energizing circuits for these windings. Consequently, incident to operation of either of the channel relays 842 and 844, the motor 858 is energized and hence the main tuning shaft 45 is driven under the exclusive control of the programming mechanism 955.

It should be understood that the channel up relay 842 and the channel down relay 844 are identical in structure and operation to the above-described channel up relay 330 and channel down relay 332 in the FIG. 10 embodiment. The energizing circuit for the channel up relay 842 is as follows: ground, control tube 837, conductor 951, relay winding 842a and B-plus, the relay 842 being operative to close contacts 953 to complete an energizing circuit for the motor control winding 778, as follows, ground, contacts 953, conductor 973, conductor 892, et cetera. The energizing circuit for the channel down relay 844 is as follows: ground, control tube 833, conductor 960, relay winding 844a, and B-plus, the relay 844 being operative to close contacts 962 to complete an energizing circuit for the motor control winding 780, as follows: ground, contacts 962, conductor 964, conductor 932, et cetera. The programming mechanism 955 is identical to the programming mechanism 494 of the FIG. 10 embodiment and functions in an identical manner to move the main tuning shaft 45 into its desired channel position. The programming mechanism 955 includes a cam follower 957 operable to close contacts 959 and 961 to complete respective holding circuits for the motor control winding 778 and 780, as follows: ground, contacts 959, conductor 963, conductor 892, et cetera, and ground, contacts 961, conductor 965, conductor 932, et cetera.

From the foregoing description, it will be appreciated that when either one of the channel relays 842 or 844 is operated during the movement of the potentiometer shaft 49 by the motor 858 operated under the control of either of the stepping mechanisms 872 or 918, the movement of the rocker assembly 850 into its operative position (not shown) only opens the contacts 883 or 923 to open the energizing circuit for the winding 778 or 780, but in no way affects the stepper mechanism 872 or 918. In fact, in either case, the stepper mechanism 872 or 918 maintains the shunt circuit for the contacts 874 or 920 closed as long as another third or fourth ultrasonic signal is not transmitted. Consequently, when the rocker assembly 850 is returned to the position shown in FIG. 12 and the contacts 883 and 923 are closed, the motor control windings 778 or 780 again becomes energized under the control of the stepper mechanism 872 or 918 and the potentiometer shaft is again moved in the same direction as it was moving before the transmission of the first or second ultra-sonic signal.

Let it be assumed that the sound level of the receiver 20 was being increased when a first or second ultar-sonic signal was transmitted to tune the receiver 20 to another channel, and let it further be assumed that a third ultra-sonic signal (not a fourth ultra-sonic signal) is transmitted to adjust the volume of the receiver 20. The transmission of the third ultra-sonic signal operates the volume up relay 846 with the result that the rod 876 is actuated to move the rocker assembly 850 into the position shown in FIG. 12 and cause the rocker cam 954 to close the contacts 883 and 923. Incident to the operation of the relay 846, the armature pawl 870a steps the stepper mechanism 872 to open its associated contacts 908, and the relay contacts 874 are closed. Since the stepper mechanism 872 is stepped one operative position, the cam follower 906 opens the contacts 908 thereby to open the shunt circuit for the contacts 874. Even though the contacts 908 are opened, the contacts 874 and 884 are closed, so that the energizing circuit for the motor control winding 778 is completed and the motor 858 drivingly engages the potentiometer shaft 49. The motor 858, however, remains energized only during the transmission of the third ultra-sonic signal since at the end of the third ultra-sonic signal, the relay 846 is deenergized and the contacts 874 are opened, thereby to open the energizing circuit for the winding 778. However, in the absence of a mechanical interlock device described above, the transmission of a fourth ultra-sonic signal provides a complicated and confusing operation of the control system 823 that is not readily understood by an operator of the transmitter 824. The transmission of the fourth ultrasonic signal causes the stepper mechanism 918 to complete the shunt circuit across the contacts 920 so that both shunt circuits arcoss the contacts 874 and 920 are completed. Although the friction cam 895 prevents the simultaneously energization of the motor control winding 778 and 780, one of the pair of contacts 883 or 923 closes first when the rocker assembly 850 moves into its FIG. 12 position. Therefore, one or the other of the motor control windings is energized to move the potentiometer shaft 49 toward one end of its range since the friction cam 895 prevents the other motor control winding from being operated. Since the position limit cams 950 and 952 will open the energized motor control winding and the friction cam 895 will close the deenergized motor control winding, the potentiometer shaft 49 moves from one end to the other end of its range under the joint control of the friction cam 895 and the position limit cams 950 and 952, provided, of course, that no additional signals are transmitted. On the other hand, if additional signals are transmitted, the operator loses track of the condition of the system 823 and is unable to effectively control the receiver 20.

For the purpose of inter-relating the operation of the stepping mechanisms 872 and 918 to prevent both of the shunt circuits across the contacts 874 and 920 from being completed at the same time, a pair of mechanical interlock devices 956 and 958 are provided. Specifically, the interlock device 956 prevents the stepper mechanism 918 from operating when the cam folower 906 of the stepper mechanism 872 engages one of its associated camming buttons 902 and the interlocked device 958 prevents the camming mechanism 872 from operating when the cam follower 938 of the mechanism 918 engages one of its associated contact buttons 942. By this arrangement, the motor 858 can be operated under the control of only one or the other of the stepper mechanisms 872 and 918, but never is operated under the control of both.

Considering now the interlocking device 956 in greater detail, it comprises a mechanical connection indicated by dotted lines 956 interconnected between the cam follower 906 of the mechanism 872 and the armature pawl 916a associated with the mechanism 918 and mounted on the armature 916 of the relay 848. The mechanical connection is movable under the control of the cam follower 906 between a position illustrated in solid lines and a position illustrated in dotted lines in FIG. 12. When the stepper mechanism 872 is ineffective, i.e., when the shunt circuit across the contacts 874 is opened, the cam follower 906 engages the non-camming portion 904 to position the armature pawl 916a in its solid line position shown in FIG. 12. In this position, the operation of the relay 848 incident to the transmission of a fourth ultrasonic signal steps the stepper mechanism 918; specifically, the armature pawl 916a is able to engage the ratchet wheel 959 to step twelve position cam 937 into an adjacent operative position. However, when the stepper mechanism 872 is effective, i.e., when the shunt circuit across the contacts 874 is closed, the cam follower 906 engages one of the cam buttons 902 to position the armature pawl 916a in its dotted line position shown in FIG. 12. In this position, the operation of the relay 848 in response to a fourth ultra-sonic signal does not step the mechanism 918. Accordingly, even though a fourth ultra-sonic signal is transmitted when the stepper mechanism is effective as a result of a previously transmitted third ultra-sonic signal and further when the rocker assembly 850 is in its operative position (not shown) as a result of a previously transmitted first or second ultrasonic signal, the operation of the volume down relay 848 does not step the mechanism 918 to close the shunt circuit for the contacts 920. However, as a result of the operation of the relay 848, the contacts 920 close and the rocker assembly 850 moves into the position illustrated in FIG. 12, thereby effecting the closure of the contacts 883 and 923. Since the contacts 883 and 923 will not close simultaneously, one of the motor control winding 778 or 780 is energized first. Once the motor 858 is energized, the friction cam 895 opens one of the contacts 894 or 934 to open circuit the other of the motor control windings. Assuming that contacts 923 close before the contacts 883 and the motor control winding 780 is thus energized, the pinion gear 860 simultaneously rotates counterclockwise and axially moves into engagement with the gear train 864 to move the potentiometer shaft 49 toward the lower end of its operative range and decrease the sound level of the receiver 20—even though it may have previously been increasing prior to the tuning of the receiver 20 to another channel. The sound level is only temporarily decreased since this movement continues only during the transmission of the fourth ultrasonic signal. As described above, at the end of the transmission of the fourth ultra-sonic signal, the contacts 920 open thereby open-circuiting the motor control winding 780. The deenergization of the motor 858 causes its motor shaft 858a to move axially downward and to be slowed down by frictional forces. When the shaft 858a slows down to a point that the friction cam 895 permits the closure of the contacts 894, the energizing circuit for the motor control winding 778 is closed, whereby a driving connection is effected between the motor 858 and the gear train 864 to rotate the potentiometer shaft 49 toward the upper end of its operative range. With the sound level of the receiver 20 increasing, it is only necessary that a third ultra-sonic signal be transmitted to operate the relay 846. The operation of the relay 846, among other things, steps the stepper mechanism 872 to open the contacts 908 and open the shunt circuit across the contacts 874. As described above, the energizing circuit for the motor control winding 778 is opened at the end of the transmission of the third ultrasonic signal, whereby the movement of the potentiometer shaft 49 is stopped to produce the desired sound level.

It will be understood that if, as a result of the rocker assembly 850 moving from its operative position (not shown) to its FIG. 12 operative position, the contacts 883 close before the contacts 923, the motor control winding 778 is energized and the sound level of the receiver 20 increases instead of temporarily decreasing. The level will continue to increase until a third ultra-sonic signal is transmitted and the above-described operation is repeated.

The interlock device 958 is identical in construction and in operation to the above-described interlock device 956. It briefly comprises a mechanical connection identified by 958 and interconnected between the cam follower 938 of the stepper mechanism 918 and an armature pawl 870a associated with the stepper mechanism 872 and mounted on the armature 870 of the relay 846. As above, the follower 938 positions the armature pawl 870a in either its solid line position in FIG. 12 or its dotted line position in FIG. 12. It will be appreciated that all of the above discussion directed to the interlock device 956 is also applicable to the interlock device 958.

While several embodiments described herein are at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A control system operable by energy signals radiated from a remotely positioned transmitter means for controlling an electrical circuit means including a plurality of adjustable elements associated respectively with a plurality of control functions each having a plurality of operative conditions, means responsive to first energy signals for sequentially establishing driving connections to selected ones of said adjustable elements and prime mover means operable in response to second energy signals for driving selected ones of said adjustable elements through said driving connections for predetermined periods of time to incrementally change the operative condition of the control functions in a first predetermined manner and further operable in response to third energy signals for driving selected ones of said adjustable elements through said driving connections for predetermined periods of time to incrementally change the operative condition of the control functions in a second predetermined manner.

2. A control system operable by energy signals radiated from a remotely positioned transmitter means for controlling an electrical circuit means including a plurality of adjustable elements associated respectively with a plurality of control functions each having a plurality of operative conditions, prime mover means including an output driving means operable in response to a first signal to produce rotation of said driving means in a first direction for a predetermined period of time and operable in response to a second signal to produce rotation of said driving means in a second direction for a predetermined period of time, and means operable in response to third energy signals to establish a driving connection during said predetermined periods of time between said prime mover means and a selected one of said adjustable elements to effect incremental adjustment of the associated control function.

3. In a remote control system, a bidirectional motor means including an output driving means, means operable to render effective said output driving means, gearing means including a plurality of gear trains each of which includes an input gear, means for adjustably positioning said input gear so that one of said gear trains is rendered effective to be driven by said motor means when said output driving means is rendered effective.

4. In a remote control system, a bidirectional motor means including an output driving means, means operable to render effective said output driving means, gearing means including a plurality of gear trains each of which includes an axially movable input gear movable between an operative and an inoperative position, and means for moving said input gears so that said input gears are sequentially moved into their operative positions to render their associated gear trains effective, said effective gear train being driven by said motor means incident to said output driving means being rendered effective.

5. In a remote control system, a bidirectional motor means including an output driving means, means operable to render effective said output driving means, gearing means including a plurality of gear trains each having an input gear, means for supporting the input gears for axial and rotative movement, means for sequentially moving said input gears into operative positions to render their associated gear trains effective, said effective gear train being driven by said motor means when the output driving means is rendered effective.

6. In a remote control system, a bidirectional motor means including an output driving means, means operable to render effective said output driving means, gearing means including a pair of gear trains each having an input gear, means for supporting the input gears for axial and rotative movement, and rocker assembly means for alternately moving the input gears into operative positions to render effective their associated gear trains, said effective gear trains being drivingly connected to motor means when said output driving means is rendered effective.

References Cited in the file of this patent

UNITED STATES PATENTS

| | | |
|---|---|---|
| 1,591,417 | Flocco | July 6, 1926 |
| 2,189,558 | Baxter | Feb. 6, 1940 |
| 2,527,565 | Miller | Oct. 31, 1950 |
| 2,530,725 | Pizer | Nov. 21, 1950 |
| 2,930,955 | Bourget et al. | Mar. 29, 1960 |
| 2,947,812 | Parmet et al. | Aug. 2, 1960 |